(12) United States Patent
Sundar

(10) Patent No.: US 8,948,487 B2
(45) Date of Patent: Feb. 3, 2015

(54) NON-RIGID 2D/3D REGISTRATION OF CORONARY ARTERY MODELS WITH LIVE FLUOROSCOPY IMAGES

(75) Inventor: Hari Sundar, Austin, TX (US)

(73) Assignee: Siemens Aktiengesellschaft, Munich (DE)

( * ) Notice: Subject to any disclaimer, the term of this patent is extended or adjusted under 35 U.S.C. 154(b) by 250 days.

(21) Appl. No.: 13/613,308

(22) Filed: Sep. 13, 2012

(65) Prior Publication Data

US 2013/0094745 A1 Apr. 18, 2013

Related U.S. Application Data

(60) Provisional application No. 61/540,134, filed on Sep. 28, 2011.

(51) Int. Cl.
| | |
|---|---|
| *G06K 9/00* | (2006.01) |
| *G06T 3/00* | (2006.01) |
| *G06T 7/00* | (2006.01) |
| *G06K 9/32* | (2006.01) |

(52) U.S. Cl.
CPC ............ *G06T 3/0068* (2013.01); *G06T 7/0028* (2013.01); *G06T 7/0032* (2013.01); *G06T 3/0081* (2013.01); *G06T 2207/10072* (2013.01); *G06T 2207/10121* (2013.01); *G06T 2207/30101* (2013.01); *G06T 2207/30172* (2013.01)
USPC .......................................... 382/132; 382/294

(58) Field of Classification Search
None
See application file for complete search history.

(56) References Cited

U.S. PATENT DOCUMENTS

| | | | | |
|---|---|---|---|---|
| 7,450,743 | B2* | 11/2008 | Sundar et al. ................ | 382/128 |
| 2006/0269108 | A1* | 11/2006 | Viswanathan .............. | 382/128 |
| 2009/0060308 | A1* | 3/2009 | Dawant et al. ............. | 382/131 |
| 2009/0324012 | A1* | 12/2009 | Sun et al. .................. | 382/103 |
| 2011/0026794 | A1* | 2/2011 | Sundar et al. ............. | 382/131 |

OTHER PUBLICATIONS

Chui, Haili, and Anand Rangarajan. "A new point matching algorithm for non-rigid registration." Computer Vision and Image Understanding 89.2 (2003): 114-141.*

(Continued)

*Primary Examiner* — Atiba O Fitzpatrick
*Assistant Examiner* — Carol Wang

(57) ABSTRACT

A method for non-rigid registration of digital 3D coronary artery models with 2D fluoroscopic images during a cardiac intervention includes providing a digitized 3D centerline representation of a coronary artery tree that comprises a set of S segments composed of $Q_S$ 3D control points, globally aligning the 3D centerline to at least two 2D fluoroscopic images, and non-rigidly registering the 3D centerline to the at least two 2D fluoroscopic images by minimizing an energy functional that includes a summation of square differences between reconstructed centerline points and registered centerline points, a summation of squared 3D registration vectors, a summation of squared derivative 3D registration vectors, and a myocardial branch energy. The non-rigid registration of the 3D centerline is represented as a set of 3D translation vectors $r_{s,q}$ that are applied to corresponding centerline points $x_{s,q}$ in a coordinate system of the 3D centerline.

23 Claims, 12 Drawing Sheets

(56) References Cited

OTHER PUBLICATIONS

Liao, Rui, et al. "An efficient graph-based deformable 2D/3D registration algorithm with applications for abdominal aortic aneurysm interventions." Medical Imaging and Augmented Reality. Springer Berlin Heidelberg, 2010. 561-570.*

Groher, Martin, Darko Zikic, and Nassir Navab. "Deformable 2D-3D registration of vascular structures in a one view scenario." Medical Imaging, IEEE Transactions on 28.6 (2009): 847-860.*

Shechter, Guy, et al. "Three-dimensional motion tracking of coronary arteries in biplane cineangiograms." Medical Imaging, IEEE Transactions on 22.4 (2003): 493-503.*

Yanghai Tsin, et al., "A Deformation Tracking Approach to 4D Coronary Artery Tree Reconstruction," MICCAI 2009, Part 11, LNCS 5762, pp. 68-75, 2009.

Matthias Schneider, et al., "Automatic Global Vessel Segmentation and Catheter Removal Using Local Geometry Information and Vector Filed Intergration," 2010, IEEE, pp. 45-48.

Hari Sundar, et al., "A Novel 2D-3D Registration Algorithm for Aligning Fluoro Images With 3D Pre-Op CT/MR Images,", Mar. 10, 2006.

Ken Shoemake, et al., "Matrix Animation and Polar Decomposition,", 1992.

Yoshinobu Sato, et al., "Three-Dimensional Multi-Scale Line Filter for Segmentation and Visualization of Curvilinear Structures in Medical Images," Medical Image Analysis (1998) vol. 2, No. 2, pp. 143-168.

Xavier Pennec, et al., "A Framework for Uncertainty and Validation of 3-D Registration Methods Based on Points and Frames," International Journal of Computer Vision, 25 (3), pp. 203-229 (1997).

Epipolar Geometry and the Fundamental Matrix, pp. 239-261, 2004.

Julien Couet, et al., Intensity-Based 3D/2D Registration for Percutaneous Intervention of Major Aorto-Pulmonary Collateral Arteries, pp. 1-8, Feb. 23, 2012.

Jonathan Boisvert, et al., Geometri Variability of the Scoliotic Spine Using Statistics on Articulated Shape Models, IEEE Transactions on Medical Imaging vol. 27 No. 4, Apr. 2008.

Christophe Blondel, et al., "Reconstruction of Coronary Arteries From a Single Rotational X-Ray Projection Sequence," IEEE Transactions on Medical Imaging, vol. 25, No. 5, May 2006.

\* cited by examiner (a)

(b)

(c)

(d)

TABLE I
Mean Residual 2D Projection Error, in MM, Calculated After Rigid, Affine, and Nonrigid Registration for Five Patients

|  | Subject | Translation | | | Rigid | | | Affine | | | Non-Rigid | | |
|---|---|---|---|---|---|---|---|---|---|---|---|---|---|
|  |  | mean | std | max | mean | std | max | mean | std | max | mean | std | max |
| LCA | 1 | 3.248 | 3.547 | 15.661 | 1.168 | 1.149 | 7.031 | 1.174 | 1.155 | 7.031 | 0.663 | 0.742 | 7.031 |
|  | 2 | 5.734 | 4.945 | 18.621 | 5.352 | 4.830 | 17.959 | 2.241 | 2.879 | 14.440 | 1.537 | 1.969 | 14.440 |
|  | 3 | 2.430 | 2.325 | 14.398 | 1.731 | 1.588 | 8.700 | 1.204 | 1.088 | 7.886 | 0.838 | 0.856 | 7.886 |
| RCA | 4 | 2.653 | 2.565 | 10.205 | 2.558 | 2.458 | 10.037 | 2.210 | 2.376 | 9.190 | 1.049 | 1.281 | 8.243 |
|  | 5 | 3.161 | 2.701 | 11.701 | 2.627 | 2.286 | 10.259 | 2.627 | 2.286 | 10.259 | 1.380 | 1.333 | 7.251 |

NON-RIGID 2D/3D REGISTRATION OF CORONARY ARTERY MODELS WITH LIVE FLUOROSCOPY IMAGES

CROSS REFERENCE TO RELATED UNITED STATES APPLICATIONS

This application claims priority from "Non-Rigid 2D/3D Registration of Coronary Artery Models with Live Fluoroscopy for Guidance of Cardiac Interventions", U.S. Provisional Application No. 61/540,134 of Hari Sundar, filed Sep. 28, 2011, the contents of which are herein incorporated by reference in their entirety.

TECHNICAL FIELD

This disclosure is directed to methods for non-rigid 2D/3D registration of anatomical models in digital medical images.

DISCUSSION OF THE RELATED ART

X-ray fluoroscopy is the modality of choice for the guidance of many minimally invasive procedures, such as percutaneous coronary interventions (PCI) of chronic total occlusions (CTO). During these procedures, the crossing of the CTO using a guide-wire is particularly hazardous since the occlusion blocks the propagation of the contrast agent, and makes the occluded portion of the vessel invisible under fluoroscopy. In addition, the projective nature of fluoroscopy results in ambiguities in the interpretation of 3D structures, which further complicates the intervention. Similar challenges arise in a vast array of minimally invasive procedures.

Current pre-interventional planning routinely includes the acquisition of a computed tomography angiography (CTA), or other 3D imaging modality, which is used to reduce visual uncertainty. The performance characteristics of CTA with blood pool contrast injection enables the calcifications causing the CTOs to be clearly distinguished, as opposed to what can be perceived with interventional X-ray fluoroscopy with direct contrast agent injection. This makes CTA a highly valuable tool at the planning stage, but establishing correspondence between these data and the interventional images can prove challenging.

To address this issue, a pre-procedure 3D model can be extracted from the acquired volume, aligned with the 2D fluoroscopic views, and overlaid on top of the live images, thereby augmenting the interventional images. However, achieving this alignment is a challenge in itself, mainly because finding intermodal correspondence is nontrivial, and also because of the nonlinear aspect of the underlying optimization. Furthermore, a simple rigid transformation might not suffice to provide a satisfying 2D/3D registration. Since the 3D planning image is acquired under a breathold, there are significant shape changes as compared to the intraoperative images acquired under free breathing. This makes it useful to use a nonrigid registration method while aligning the preoperative model with the live intraoperative images. This is, however, a challenging ill-posed inverse task. Nevertheless, 2D/3D registration methods have the potential to greatly reduce the uncertainty relative to interventional X-ray angiography, and to do so with only minimal modification to the existing clinical flows. From a broader perspective, 2D/3D registration methods have numerous applications in fields such as neurology, orthopedics, and cardiology.

The optimization surface in 2D/3D registration can be highly nonlinear for several reasons: the discretization of the image, the complexity of the structures to be registered, and the use of a rigid or affine transformation model. As a result, the minimization of the cost function is challenging. The maximal precision that can potentially be achieved by a registration process is directly linked to the complexity of the transformation model involved. Many 2D/3D registration approaches consider only a rigid transformations model or a slightly more flexible affine model. In general, this is appropriate for rigid structures, such as bones, or to provide an initial alignment of the modalities, but might prove insufficient to account for the shape changes of flexible structures. Consequently, nonrigid deformation models have been proposed for 2D/3D registration.

In a clinical setting, one or two fluoroscopic planes are used for intervention guidance. Monoplane scenarios have been investigated, but the reported errors are large in the out-of-plane direction. This lack of accuracy seriously limits confidence in the registration process. Biplane acquisition greatly reduces the ambiguity associated with these interventions, and are now performed on a daily basis for complex cardiac interventions.

SUMMARY

Exemplary embodiments of the invention as described herein generally include systems and methods for a 2D/3D nonrigid registration that can nonrigidly align a preoperative 3D centerline model of the coronary arteries with two or more intraoperative fluoroscopic images to visually augment the interventional images. A registered model according to an embodiment of the invention can be overlaid on top of the interventional angiograms to provide surgical assistance during image-guided chronic total occlusion procedures, thereby reducing the uncertainty inherent in 2D interventional images. A method according to an embodiment of the invention includes two parts: (1) a global transformation model that is calculated to provide an initial rigid or affine alignment, and (2) a fully nonrigid model that is used to compute the final registration. To estimate the global alignment parameters, distance maps are used to measure the discrepancies between the projections of the 3D model and features automatically extracted from the 2D images. In the second part, a fully nonrigid registration method is used to compensate for any local shape discrepancy. A nonrigid registration method according to an embodiment of the invention is based on a variational framework, and uses a simultaneous matching and reconstruction process to compute a nonrigid registration. With a typical run time of less than 3 s on modern hardware, an algorithm according to an embodiment of the invention can be solved fast enough to be used intraoperatively during CTO procedures. In addition, a 2D/3D registration method according to an embodiment of the invention can also be used to capture the motion of the structure of interest across a sequence of frames.

According to an aspect of the invention, there is provided a method for non-rigid registration of digital 3D coronary artery models with 2D fluoroscopic images during a cardiac intervention, including providing a digitized 3D centerline representation of a coronary artery tree, where the 3D centerline comprises a set of S segments composed of $Q_s$ 3D control points, globally aligning the 3D centerline to at least two 2D fluoroscopic images, and non-rigidly registering the 3D centerline to the at least two 2D fluoroscopic images by minimizing an energy functional that includes a summation of square differences between reconstructed centerline points and registered centerline points, a summation of squared 3D registration vectors, a summation of squared derivative 3D registration vectors, and a myocardial branch energy, where the non-rigid registration of the 3D centerline is represented as a set of 3D translation vectors $r_{s,q}$ that are applied to corresponding centerline points $x_{s,q}$ in a coordinate system of the 3D centerline.

According to a further aspect of the invention, the coronary artery tree has been segmented from the 2D fluoroscopic images, where the segmented coronary artery tree is represented as a binarization of each of the 2D fluoroscopic images.

According to a further aspect of the invention, globally aligning the 3D centerline to the at least two 2D fluoroscopic images includes performing a translation-only registration of the 3D centerline to the at least two 2D fluoroscopic images, performing a rigid registration of the 3D centerline to the at least two 2D fluoroscopic images, and performing an affine registration of the 3D centerline to the at least two 2D fluoroscopic images, where at each step, an energy functional of the form $$E^j_{Global}(C \cdot T_j \cdot x) = \sum_n \sum_{s,q} D_{B_n}(\Psi_n \cdot P_n \cdot C \cdot T_j \cdot x)$$

is minimized, where j labels the translation-only registration, the rigid registration, and the affine registration, C is a coordinate transformation between a coordinate system of the 3D centerline and a coordinate system of a 3D imaging device, $T_j$ is a coordinate transformation between a coordinate system of the 3D imaging device and a coordinate system of a biplane C-arm that acquires the fluoroscopic images, for the translation-only, rigid, and affine registrations, x is a 3D point in homogeneous coordinates, n represents a sum over the fluoroscopic images, s and q label control points on the segments of the 3D centerline, $P_n$ is a coordinate transformation between the coordinate system of the biplane C-arm and the coordinate system of the $n^{th}$ fluoroscopic image, $\Psi_n$ is a projection operator that projects the 3D point x to the $n^{th}$ fluoroscopic image, and $D_{B_n}(x)$ is a distance between a 2D point on the $n^{th}$ fluoroscopic image and a closest point in the segmented coronary artery tree in the $n^{th}$ binarized image $B_n$.

According to a further aspect of the invention, transformation matrices $T_j$ are recentered where any change in rotation parameters of the transformation matrixes $T_j$ induces a motion that appears to occur around the origin of the coordinate system of the 3D centerline, as opposed to the origin of the coordinate system of the 3D imaging device.

According to a further aspect of the invention, the method includes providing a time series of F pairs of 2D fluoroscopic images, and globally aligning the 3D centerline to each pair of 2D fluoroscopic images by minimizing the energy functional $$E_{Multi}(\chi_f) =$$

$$\sum_{f=1}^{F}\sum_{n=1}^{2}\sum_{s,q} D_n(\Psi_n \cdot P_n \cdot T_f \cdot C \cdot x_{s,q}) + \gamma \sum_{f=1}^{F-1} D(T_f \cdot C \cdot x_{s,q}, T_{f+1} \cdot C \cdot x_{s,q}),$$

where f is a sum over time points, $T_f$ is a transformation for each time point, $\gamma$ is a predetermined parameter, and $D(T_f \cdot C \cdot x_{s,q}, T_{f+1} \cdot C \cdot x_{s,q})$ is an inter-frame distance.

According to a further aspect of the invention, the method includes, after globally aligning the 3D centerline to at least two 2D fluoroscopic images, matching points in the 3D centerline to corresponding vessel centerline points in the 2D fluoroscopic images to reconstruct 3D centerline points $\hat{x}_{s,q}$ from the matched 2D points.

According to a further aspect of the invention, matching points includes finding a projection x' of each 3D centerline point $x_{s,p}$ on each 2D fluoroscopic image $I_n$ from the global alignment, starting from x', searching a segmentation image $B_n$ corresponding to each 2D fluoroscopic image along a line perpendicular to a projection of the 3D centerline on the segmentation image B to find up to two points that may match centerline point $x_{s,p}$, selecting a point closest to $x_{s,p}$ as a match point $x_n$, using matched points in the fluoroscopic images to reconstruct a 3D centerline point $\hat{X}_{s,q}$ using projective geometry of an imaging system being used for the cardiac intervention.

According to a further aspect of the invention, the summation of square differences between reconstructed centerline points $\hat{x}_{s,q}$ and registered centerline points $\overline{X}_{s,q}$ is $$E_{Image}(r) = \sum_{s,q} H(x_{s,q})(\hat{x}_{s,q} - \overline{x}_{s,q})^2,$$

where $H(x_{s,p}) \mapsto \{0,1\}$ is an indicator function $H(x_{s,p}| \{0,1\}$, where $H(x_{s,p})=0$ if no matching point is found in any image planes, or a 2D distance between a projection x' of $\overline{X}_{s,q}$ on a 2D fluoroscopic image and a matched point $x''_n$ in the $n^{th}$ 2D fluoroscopic image is greater than a predetermined threshold $Max_{2D}$, or a 3D distance between a centerline point $x_{s,q}$ and a corresponding reconstructed point $\hat{x}_{s,q}$ is greater than a predetermined threshold $Max_{3D}$, where $H(x_{s,p})=1$ otherwise.

According to a further aspect of the invention, the summation of squared 3D registration vectors, the summation of squared derivative 3D registration vectors, and the myocardial branch energy of the energy functional are $$E_{Internal}(r) = \mu \sum_{s,q} |r^2_{s,q}| + \nu \sum_{s,q} |\dot{r}^2_{s,q}| + \lambda \sum_{\{i,j\} \in K} \left(\frac{|r_i - r_j|}{|x_i - x_j|}\right)^2,$$

where r is a registration vector, x is a control point on the 3D centerline, the sums over s,q are sums over all control points of all segments of the 3D centerline, K is a set of all pairs of control points formed by linking a point on each segment that is a distance $D_s$ from a junction in the 3D centerline to corresponding control points of other segments joined at the junction where each link generates a force proportional to its displacement if the link is either expanded or compressed during registration.

According to a further aspect of the invention, the energy functional is minimized by iterating $$r^{z+1}_{s,q} =$$

$$r^z_{s,q} + \varepsilon \left[ H(x_{s,q})(\hat{x}^z_{s,q} - \overline{x}^z_{s,q}) - \mu r^z_{s,q} + \nu \ddot{r}^z_{s,q} + \lambda \sum_{\{i\} \in K_{s,p}} (r^z_i - r^z_{s,q}) \right]$$

where z is an iteration counter starting at point $r_{s,p}=[0,0,0]^T | \forall \{s,q\}$ at iteration z=0, where $\varepsilon$ is a small constant, $K_{s,q} \subset K$ is a set of constraints acting on control point (s, q), and $\mu$, $\nu$ and $\lambda$ are predetermined parameters.

According to another aspect of the invention, there is provided a non-transitory program storage device readable by a computer, tangibly embodying a program of instructions executed by the computer to perform the method steps for non-rigid registration of digital 3D coronary artery models with 2D fluoroscopic images during a cardiac intervention.

DETAILED DESCRIPTION OF EXEMPLARY EMBODIMENTS

Figure 1:
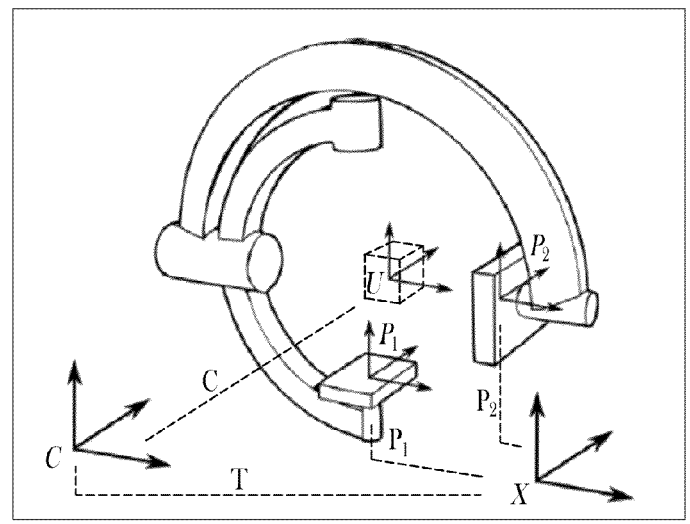
FIG. 1 is a schematic representation of the geometry of a system under consideration, according to an embodiment of the invention.

Exemplary embodiments of the invention as described herein generally include systems and methods for non-rigid 2D/3D registration of coronary artery models with live fluoroscopy images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical age of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, a 3D centerline representation of a coronary artery tree, segmented from a preoperative CTA volume, may be nonrigidly registered to two or more simultaneous fluoroscopic images. Starting from a default 3D location, computed from a calibration of the apparatus, the 3D alignment of the centerline is progressively refined using translation-only motions, a rigid transformation, and an affine transformation. Lastly, a non-rigid transformation is computed and provides the final registration.

According to an embodiment of the invention, the coronary tree can be represented by a set of S segments $Q_S$ composed of control points $x_{s,p} \in R^3$, $s \in \{1, \ldots, S\}$, $q \in \{1, \ldots, Q_S\}$, forming an undirected acyclic graph. For clarity of the description and without loss of generality, the description can be restricted to a case in which a pair of fluoroscopic images $I_n$, $n \in \{1, 2\}$, is provided. However, it is to be understood that this restriction is exemplary and non-limiting, and methods of embodiments of the invention can be extended to a plurality of fluoroscopic images. Again, for clarity of the description and without loss of generality, it may be assumed that both are of the same size $W \times H \in N^2$. The vessels can be automatically segmented from the input fluoroscopic images using known methods and represented as a binarization $B_n(i, j)$ of the input image $I_n(i, j)$. $B_n(i, j)=1$, if an input image pixel at location $(i, j) \in \{0, \ldots, W-1\} \times \{0, \ldots, H-1\}$ corresponds to a structure of interest, and $B_n(i, j)=0$, otherwise.

The geometry of the system under consideration is represented schematically in FIG. 1 and is described using five coordinate systems (CS). The labeled frames in FIG. 1 represent coordinate systems, while the dashed lines and bold symbols represent transformation matrixes. The 3D centerline representing the coronary tree is described with respect to U, and a CS C is centered at the reference point of the 3D imaging device. In term of 2D angiography, X is the reference CS of the biplane C-arm, and CSs $P_1$ and $P_2$ are centered on the 2D imaging planes. The transformations between C and U, and between X and $\{P_1, P_2\}$, are known from the calibration of the apparatus, and are encoded in the rigid transformation matrixes C, $P_1$ and $P_2$, respectively. The projective geometry of the two X-ray planes is also assumed to be available, and is encoded in the projection operators $\Psi_1$ and $\Psi_2$ that map a 3D point in homogeneous coordinates $x=[x,y,z,1]^T$ to a 2D point $x'=[x, y]$ on the corresponding fluoroscopic plane. The transformation between the two imaging modality coordinate systems is represented by T.

For the sake of completeness, an exemplary, non-limiting automatic segmentation method briefly outlined here: (1) an input fluoroscopic image is processed using a Hessian-based Sato vesselness filter; (2) seed points are generated by sparsely sampling a thresholding of the vesselness measure; (3) starting from those points, fibers are generated by integrating along the first eigenvector of the Hessian matrix computed at each pixel location; and (4) the fiber bundles are iteratively thinned to extract the centerlines of the vessels.

Translational, Rigid, and Affine Alignment

In a typical clinical setting, the transformation that aligns the 3D coronary centerlines from the CTA acquisition to the images of the same structures on the biplane fluoroscopy can only be measured approximately, since the position of the patient cannot be controlled with a high degree of accuracy. A transformation T according to an embodiment of the invention, that is, the mapping between the two imaging modality coordinate systems, can be estimated by a calibration of the apparatus, and refined by taking into account the geometry of the structures of interest. Starting from the initial conditions, improved alignment transformations can be computed using a minimization process to estimate the parameters of a global translational or rigid transformation model. From that point, an affine transformation model can also be used to deform the 3D centerline in order to compensate for the shape discrepancy between the CTA and the biplane X-rays.

According to an embodiment of the invention, a total distance between the projection of the 3D centerline and the vessel centerlines segmented on each fluoroscopic plane is to be minimized. Let $\chi(x)=T \cdot C \cdot x$ be an affine transformation operator that maps a point $x=[x, y, x, 1]$ relative to U, to the X coordinate system. Also, let $\pi_n(x)=\Psi_n \cdot P_n \cdot x$ be a projection that maps a point from X to the fluoroscopic plane $P_n$. Embodiments of the invention define the energy $$E_{Global}(\chi) = \sum_{n=1}^{2} \sum_{s,q} D_{B_n}(\Pi_n(\chi(x_{s,q}))) \quad (1)$$

as the quantity that needs to be minimized, summed over the two fluoroscopic images. Here, $D_{B_n}(x)$ is the distance between a 2D point and the closest point where $B_n(i,j)=1$. The distance $D_{B_n}(x)$ for each image position is computed beforehand, by creating the distance transform of each $B_n(i, j)$ segmentation. Note that the use of two fluoroscopic images is exemplary and non-limiting, and the sum can be easily extended in embodiments if more than two fluoroscopic images are being used.

Figure 2:
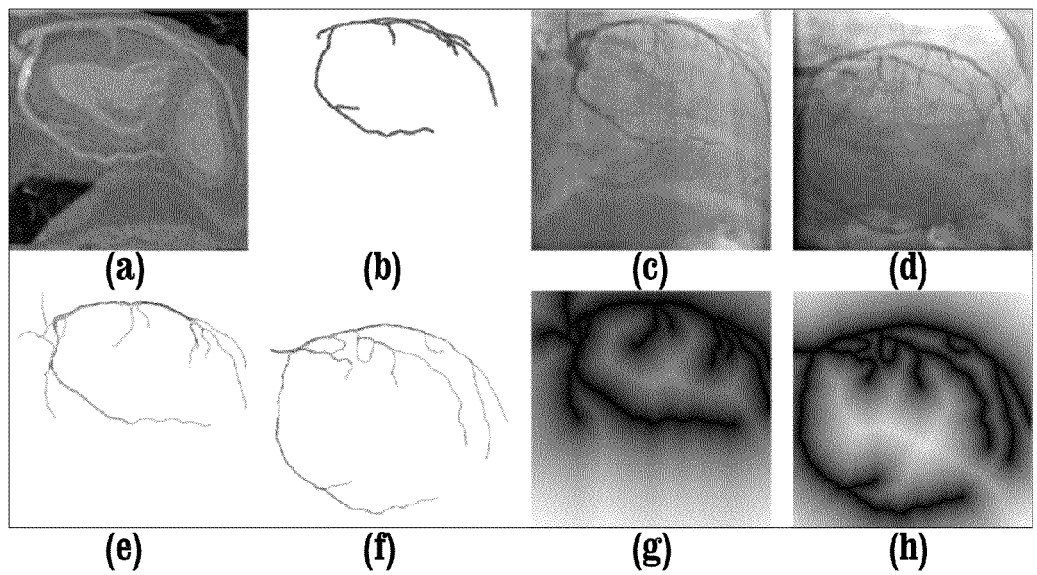
FIGS. 2(a)-(h) illustrates the transformations of the input data through various stages of registration, according to an embodiment of the invention.

FIGS. 2(a)-(h) illustrates the transformations of the input data. FIG. 2(a) depicts a curved slice from a CT volume; FIG. 2(b) depicts 3D centerlines; FIGS. 2(c) and (d) depict fluoroscopic angiograms from 2 different points of view; FIGS. 2(e) and f) depict segmentation of the fluoroscopic images; and FIGS. 2(g) and (h) depict the distance transforms of the segmentations.

Optimizing the 12 values of T directly is both ineffective and inefficient, and so embodiments of the invention use a parametric approach instead. The translation-only, rigid, or affine transformations $T_T$, $T_R$ and $T_A$ are represented using the parameter sets $T \in R^3$, $R \in R^6$, $A \in R^{12}$ respectively. The mappings from the parametric to the matrix representations of the Ts are defined as follows:

$$T_T(T) = M_T(T_1^3)$$

$$T_R(R) = M_T(R_1^3) \cdot M_R(R_4^6)$$

and $$T_A(A) = M_T(A_1^3) \cdot M_R(A_4^6) \cdot M_R(A_{10}^{12}) \cdot M_S(A_7^9) \cdot (M_R(A_{10}^{12}))^T \quad (2)$$

Where $S_i^j$ is the subset containing the elements with indexes $\{i, \ldots, j\}$ of S, $$M_T(T) = \begin{pmatrix} 1 & 0 & 0 & t_x \\ 0 & 1 & 0 & t_y \\ 0 & 0 & 1 & t_z \\ 0 & 0 & 0 & 1 \end{pmatrix}, M_S(S) = \begin{pmatrix} s_x & 0 & 0 & 0 \\ 0 & s_y & 0 & 0 \\ 0 & 0 & s_z & 0 \\ 0 & 0 & 0 & 1 \end{pmatrix}$$

and $$M_R(\theta) = \begin{pmatrix} c_y c_z & c_z s_x s_y - c_x s_z & s_x s_z + c_x c_z s_y & 0 \\ c_y s_z & s_x s_y s_z + c_x c_z & c_x s_y s_z - c_z s_x & 0 \\ -s_y & c_y s_x & c_x c_y & 0 \\ 0 & 0 & 0 & 1 \end{pmatrix} \quad (3)$$

where $c_x = \cos(\theta_x)$, $s_x = \sin(\theta_x)$, etc. The transformation matrixes $T_T$, $T_R$, and $T_A$ are recentered in embodiments of the invention in such a way that any change in the rotation parameters induces a motion that appears to occur around the origin of the U coordinate system, as opposed to the origin of C. This operation does not influence the energy function of EQ. (1), but is usually beneficial for the optimizers. Intuitively, this is because such recentering reduces the distance, in parameter space, associated with a rotation or a scaling operation that appears to occur at the centroid of the CT volume. The final definition of T is then $$T = C \cdot T_j \cdot C^{-1}, \quad (4)$$

where C is the transformation from U to C, and $j \in \{T,R,A\}$, depending on the transformation model chosen. EQ. (1) then takes the form $$E_{Global}^j(C \cdot T_j \cdot x) = \sum_{n=1}^{2} \sum_{s,q} D_{B_n}(\Psi_n \cdot P_n \cdot C \cdot T_j \cdot x), \quad (1a)$$

for each of the three transformation models. Any nonderivative general purpose optimization algorithm can be used to minimize EQ. (1).

Starting from a default patient position, embodiments of the invention progressively refine the alignment by considering (1) translations only, (2) rigid transformations, and (3) affine transformations.

Multi Frame Alignment

A global alignment method according to an embodiment of the invention can be expanded to cover a multi-frame scenario. In this case, embodiments assume that because of temporal continuity, an estimated alignment transformation would change little from one frame to the other. A global energy function according to an embodiment of the invention can then be redefined for a sequence of biplane frames:

$$E_{Multi}(\chi_f) = \sum_{f=1}^{F}\sum_{n=1}^{2}\sum_{s,q} D_n(\Pi_n(\chi_f(x_{s,q}))) + \gamma\sum_{f=1}^{F-1} D(\chi_f, \chi_{f+1}), \quad (5)$$

or $$E_{Multi}(\chi_f) = \sum_{f=1}^{F}\sum_{n=1}^{2}\sum_{s,q} D_n(\Psi_n \cdot P_n \cdot T_f \cdot C \cdot x_{s,q}) +$$

$$\gamma\sum_{f=1}^{F-1} D(T_f \cdot C \cdot x_{s,q}, T_{f+1} \cdot C \cdot x_{s,q}),$$

where γ is a free parameter, and $\chi_f$ is defined similar to χ, but with a different transformation matrix $T_f$ for each time point. The transformation matrix $T_f$ can be translation-only, rigid, or affine as discussed above. As previously stated, the sum n over two fluoroscopic images is exemplary and non-limiting, and the sum can be easily extended in embodiments if more than two fluoroscopic images are being used.

The inter-frame distance $D(\chi_f, \chi_{f+1})$ can also be a rigid or an affine translation. The definition of the inter-frame distance $D(\chi_f, \chi_{f+1})$ according to an embodiment of the invention is delicate since the space of rigid, and affine transformation matrixes is not linear. The rigid transformation space can be locally linearized for small changes in orientation, as is assumed by embodiments of the invention. Using this framework, a rigid transformation from frame f to frame f+1 can be represented by a translation vector $\vec{t}_{f,f+1}$ and a rotation vector $\vec{r}_{f,f+1}$, defined as the product of a unit vector $\vec{n}$ and a rotation angle $\theta_{f,f+1}$, such that $\vec{r}_{f,f+1} = \theta_{f,f+1}\vec{n}$. The translation vector may correspond to the translational part of the rigid transformation matrix $Q_{f,f+1}$, and the mapping between the matrix $Q_{f,f+1}$ and the rotation vector $\vec{r}_{f,f+1}$ is given by $$\theta_{f,f+1} = \arccos\left(\frac{\text{Trace}(Q_{f,f+1}) - 1}{2}\right)$$

and $$\begin{pmatrix} 0 & -n_z & n_y \\ n_z & 0 & -n_x \\ -n_y & n_x & 0 \end{pmatrix} = \frac{Q_{f,f+1} - Q_{f,f+1}^T}{2\sin(\theta_{f,f+1})}.$$

Using this representation, embodiments can formally define the inter-frame distance as follows:

$$D(\chi_f, \chi_{f+1}) = N_\alpha(T_{f+1}^{-1} \cdot T_f) \quad (6)$$

with $$N_\alpha(Q_{f,f+1}) = \|\vec{r}_{f,f+1}\|^2 + \|\alpha\vec{t}_{f,f+1}\|^2 \quad (7)$$

Here, α is a real number that balances the respective contributions of the rotation and translation parts. Embodiments of the invention set α to 0.05, in accordance with the recommendation in Boisvert, et al., "Geometric Variability Of The Scoliotic Spine Using Statistics On Articulated Shape Models", *IEEE Trans. Med. Imag.*, Vol. 27, No. 4, pp. 557-568, April 2008, the contents of which are herein incorporated by reference in their entirety.

Defining a linear distance between affine transformation matrixes is more involved and requires complex computation. Since embodiments of the invention assume that rigid transformations capture the major part of the transformation, embodiments of the invention regularize the rigid part of the transformation and leave the remaining affine parameters unconstrained. Formally, in the case of affine transformations, the transformations $T_f$ in the regularizer definition are composed using parameters $A_1^6$, whereas the full set of 12 parameters is used to compose the transformations $\chi_f$ in the energy definition.

This energy function can be useful for tracking the alignment transformation over a sequence of frames, or, if γ→∞, for computing an average transformation using, for example, three adjacent frames. As with the single frame energy, the transformations $\chi_f$ are progressively refined by sequentially increasing the complexity of the transformation models.

Nonrigid Registration

Global affine transformation models cannot entirely compensate for intermodal shape discrepancies caused by breathing and by the beating of the heart. Embodiments of the invention provide a nonrigid registration method that can improve the visual correspondence between the 3D coronary tree centerlines and the two calibrated fluoroscopic images. A method according to an embodiment of the invention can be automatic, in the sense that it does not require the user to identify correspondences.

A non-rigid transformation according to an embodiment of the invention can be represented as a set r of 3D translation vectors $r_{s,q}$ that are applied to the corresponding centerline points $x_{s,p}$ in CS U. Thus, a registered point $\bar{x}_{x,p}$ is computed using $\bar{x}_{s,p} = x_{s,p} + r_{s,p}$. An energy according to an embodiment of the invention defined to measure the quality of a solution has the form $$E_{NR}(r) = E_{Image}(r) + E_{internal}(r). \quad (8)$$

Figure 3:
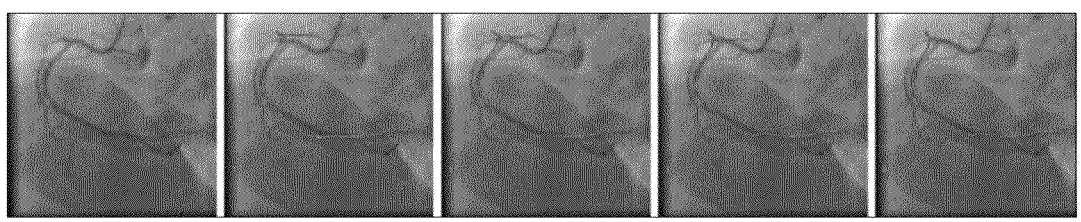
FIG. 3 illustrates the progression of a non-rigid registration, according to an embodiment of the invention.

A minimization process according to an embodiment of the invention is iterative, and, starting from the position $r_{s,q} = [0, 0, 0]^T | \forall \{s, q\}$, the transformations $r_{s,q}$ are progressively refined by following a gradient descent approach. This results in a smooth motion of the registered centerline. FIG. 3 illustrates the progression of a non-rigid registration, which from left to right, shows a sample input image and centerline position after 0, 350, and 1200 iterations, respectively.

Figure 4:
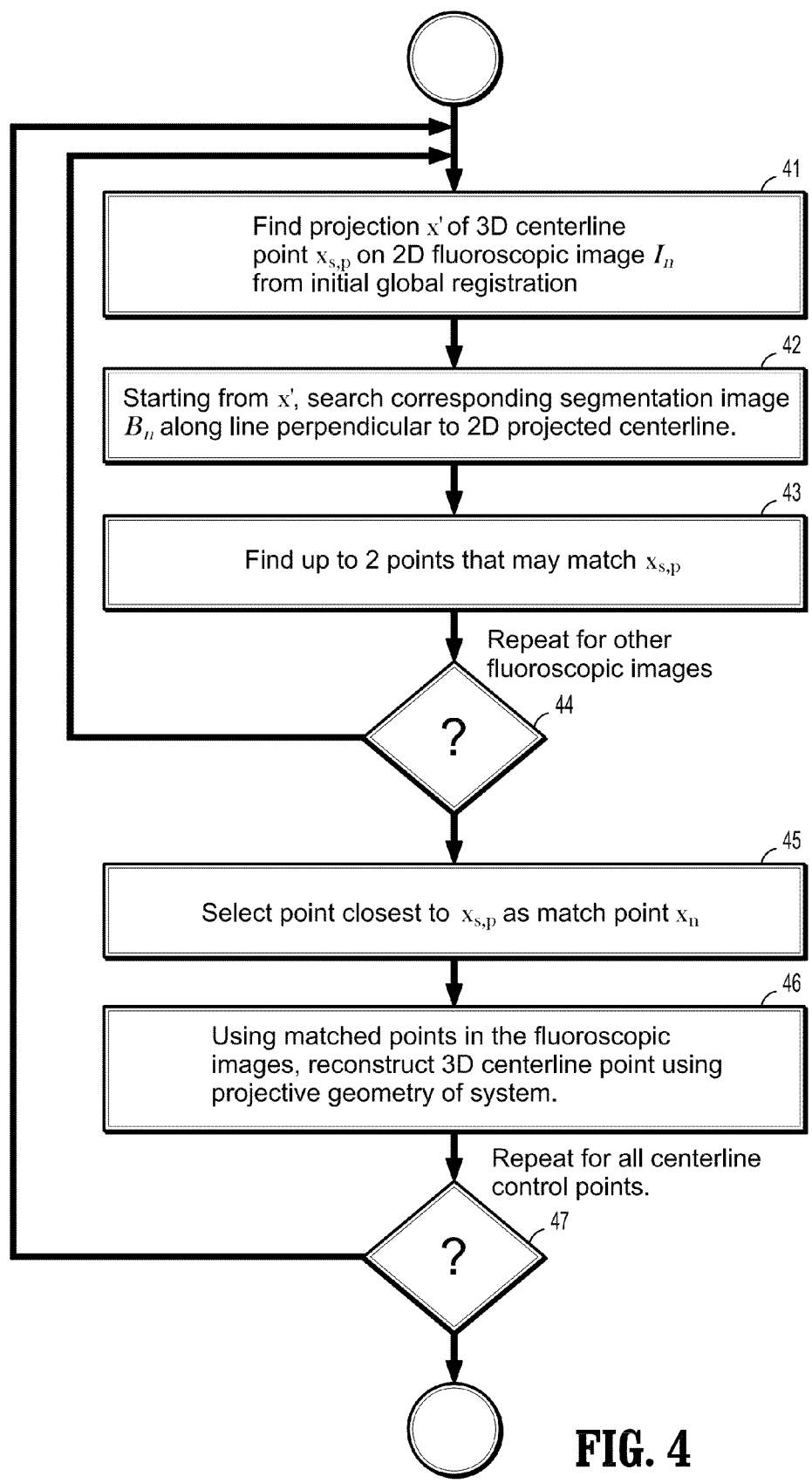
FIG. 4 is a flowchart of a centerline control point matching algorithm, according to an embodiment of the invention.
Figure 5:
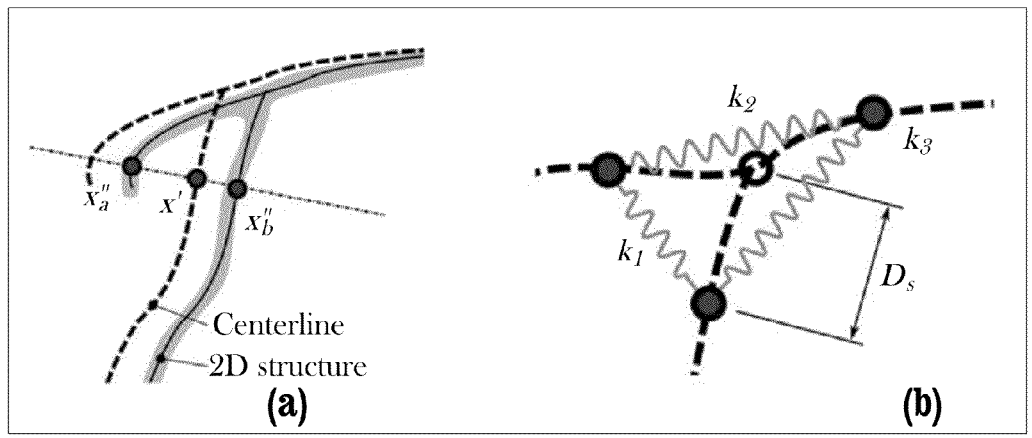
FIGS. 5(a)-(b) illustrate point matching and the creation of branch constraints at a junction, according to an embodiment of the invention.

Image energy. The image energy term is a functional of a reconstructed centerline. According to an embodiment of the invention, a matching and reconstruction process can be used to construct a projection of the centerline in each fluoroscopic image by calculating a reconstructed point $\tilde{z}_{s,q}$ for every point $x_{s,q}$ in the 3D centerline model. The matching is performed on each fluoroscopic plane separately, as follows, with reference to the flowchart of FIG. 4. A matching method according to an embodiment of the invention begins at step 41 by projecting a control point of the 3D centerline onto a fluoroscopic image n. Starting from the projection x' of 3D centerline point $\bar{x}_{s,q}$ on the fluoroscopic image n, a search on the segmentation image $B_n$ corresponding to the fluoroscopic image n is performed at step 42 in the directions perpendicular to the projection of the centerline. This direction is computed, at every location, based on the partial derivatives $(\partial x'/(\partial x), (\partial x')/(\partial y))$. As a result, at step 43, at most two matching points, $x''_a$ and $x''_b$, are identified on each fluoroscopic plane n∈{1,2}. Steps 41, 42, and 4 are repeated from step 44 for the other fluoroscopic image. At step 45, the pair $(x''_{1,i}, x''_{2,i})$, i∈a,b that minimizes the epipolar constraint:

$$d(x''_{1,i}, x''_{2,i}) = d(x''_{1,i}, e_{2,i}) + d(x''_{2,i}, e_{1,i}) \quad (9)$$

where $d(x''_{1,i}, e_{m,i})$ is the Euclidean distance between point $x''_{n,i}$ and the epipolar line induced by $x''_{m,i}, \{n,m\} \in \{1,2\}$, with n≠m, is kept. At step 46, the pair minimizing EQ. (9) is then used to calculate a reconstructed 3D point $\hat{x}_{s,q}$ using the projective geometry of the system. If only one point $x''_{n,i}$ is found on an image plane, it is retained by default. FIG. 5(a) illustrates the matching of a point from the centerline x' with a point from the 2D structure. Points x"$_a$ and x"$_b$ are identified as potential candidates; x"$_b$ is retained since it is closer to x'. Steps 41 to 46 are then repeated from step 47 for all control points in the 3D centerline.

Embodiments of the invention search for matching points in directions that are locally perpendicular to the projection of the centerline. Since it is known a priori that the global alignment of the structures is correct, the perpendicular search direction prevents many unrealistic matches, compared to a nearest-point approach. This is useful when the 2D automatic segmentation is not perfect. For example, when the 3D projection results in a curve that is longer that the 2D curve that has been automatically segmented, taking the nearest point would result in a significant shortening of the curve from its tip. In contrast, searching in a perpendicular direction reduces this effect, because no match would be found at the tip of the 3D centerline projection.

The quality of the reconstruction cannot be guaranteed, and embodiments of the invention use an indicator function $H(x_{s,p}) \to \{0,1\}$ to reject outliers. $H(x_{s,p})=0$ if: (1) no matching point is found in any image planes; or (2) the 2D distance between x' and x"$_n$, is greater than Max$_{2D}$; or (3) the 3D distance between $x_{s,q}$ and $\hat{x}_{s,q}$ is greater than Max$_{3D}$. Otherwise, $M(x_{s,p})=1$. Here, Max$_{2D}$ and Max$_{3D}$ are predetermined thresholding values. According to embodiments, exemplary, non-limiting values are Max$_{2D}$=50 pixels and Max$_{3D}$=6 mm.

According to embodiments, the image energy in EQ. (8) is defined as the sum of the squared error between the reconstructed points $\hat{x}_{s,q}$ and the registered centerline points, for all valid points, as follows:

$$E_{Image}(r) = \sum_{s,q} H(x_{s,q})(\hat{x}_{s,q} - (x_{s,q} + r_{s,q}))^2 = \sum_{s,q} H(x_{s,q})(\hat{x}_{s,q} - \bar{x}_{s,q})^2. \quad (10)$$

This energy is at its minimum when all registered centerline points are at the same position as the reconstructed points.
Internal energy. According to an embodiment of the invention, regularizers can be used to keep the registered centerline visually coherent and geometrically plausible. The following three internal energy terms according to embodiments of the invention can be considered for this purpose:

$$E_{Internal}(r) = E_{Disp}(r) + E_{Smooth}(r) + E_{Myocard}(r) \quad (11)$$

$$= \mu \sum_{s,q} |\dot{r}_{s,q}^2| + \nu \sum_{s,q} |\ddot{r}_{s,q}^2| + \lambda \sum_{\{i,j\} \in K} \left( \frac{|r_i - r_j|}{|x_i - x_j|} \right)^2,$$

where ν, ν, and λ are energy-balancing free parameters. The first term, $E_{Disp}(r)$, is minimal when the displacement due to the non-rigid transformations is small. This regularizer minimizes 3D out-of-plane motions, which are only poorly constrained by a pair of 2D angiograms. The second term, $E_{Smooth}(r)$, can ensure smoothness over each vessel segment. Here, $\dot{r}_{s,q}$ and $\ddot{r}_{s,q}$ represent, respectively, the first and second derivatives of the translation vector r for the position (s, q) with respect to the segment parameter. At the segment junctions, Neumann boundary conditions $\dot{r}_{s,p}=0$ are assumed.

With the first two internal energy terms, the centerline model is flexible, and the motions of the vessels are independent of each other, except at junction nodes. In reality, the vessel motions are mechanically constrained not only by their own specific rigidity, but also because they are attached to the myocardium. In this respect, the third term, $E_{Myocard}(r)$ can to act as a minimalist model of the myocardium constraint, and can ensure a certain degree of rigidity at the vessel branches to prevent small segments from collapsing onto bigger ones. Embodiments of the invention model this constraint by using artificial links around the junction of three segments, as depicted in FIG. 5(b), which shows the creation of three myocardium constraints ($k_1$, $k_2$, and $k_3$) at a junction. Let $D_s$ be a distance parameter, with a value set to N times the average diameter of the vessels present at the junction. An exemplary, non-limiting value of N is 3. The node on each segment that is about distance $D_s$ from the junction is joined to the corresponding nodes of the other segments in a way that is analogous to a mechanical spring, with each link generating a force that is proportional to its displacement ratio if it is either expanded or compressed during the registration process. In EQ. (11), K is defined as the set of all pairs of nodes {i, j} that have been linked together.

Energy Minimization

Figure 6:
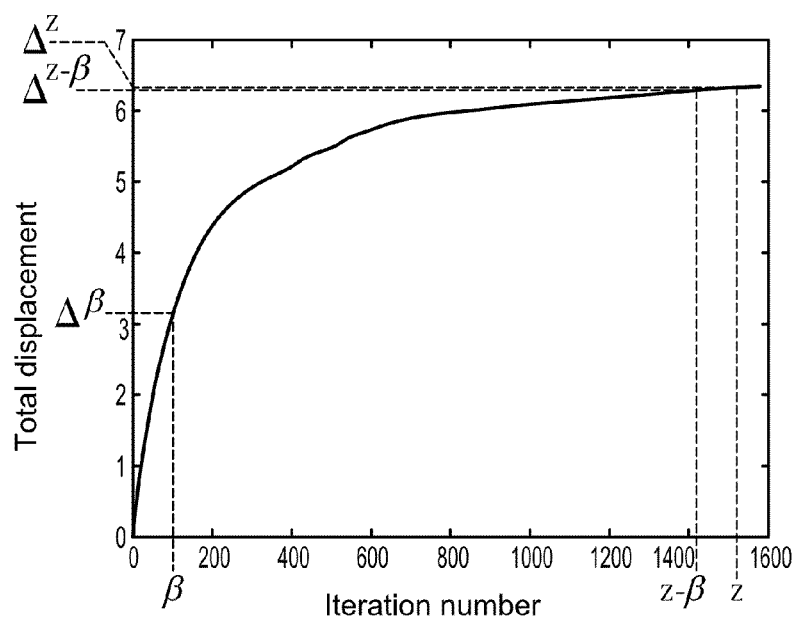
FIG. 6 is a graph of the total displacement of the centerline as a function of the number of iterations, according to an embodiment of the invention.

A complete energy function according to an embodiment of the invention is defined using EQS. (8), (10), and (11), and can be minimized in embodiments of the invention by computing its Euler-Lagrange equations and following a gradient descent approach. Starting from the point where at iteration $r_{s,p}=[0,0,0]^T|\forall\{s,q\}$ at iteration z=0, the resulting discretized update equation, according to an embodiment of the invention, is $$r_{s,q}^{z+1} = \quad (12)$$

$$r_{s,q}^z + \varepsilon \left[ H(x_{s,q})(\hat{x}_{s,q}^z - \bar{x}_{s,q}^z) - \mu r_{s,q}^z + \nu \ddot{r}_{s,q}^z + \lambda \sum_{\{i\} \in K_{s,p}} (r_i^z - r_{s,q}^z) \right]$$

where the numerical step ε is a small constant and $K_{s,q} \subset K$ is the possibly empty set of constraints acting on node (s, q). EQ. (12) can be evaluated iteratively in embodiments of the invention until the total displacement converges. More formally, the total displacement is denoted $\Delta^z \equiv \Sigma_{s,q} |r_{s,q}^z|$, and the stopping criterion is defined, for z>β, as $\Delta^z - \Delta^{z-\beta} < \zeta \Delta^\beta$. FIG. 6 illustrates the total displacement of the centerline as a function of the number of iterations z during a non-rigid registration according to an embodiment of the invention. As can be deduced from the shape of the curve, the final result is not very sensitive to the specific values of β and ζ. Exemplary, non-limiting values are β=100 and ζ=0.001.

Parameter Selection

Figure 8:
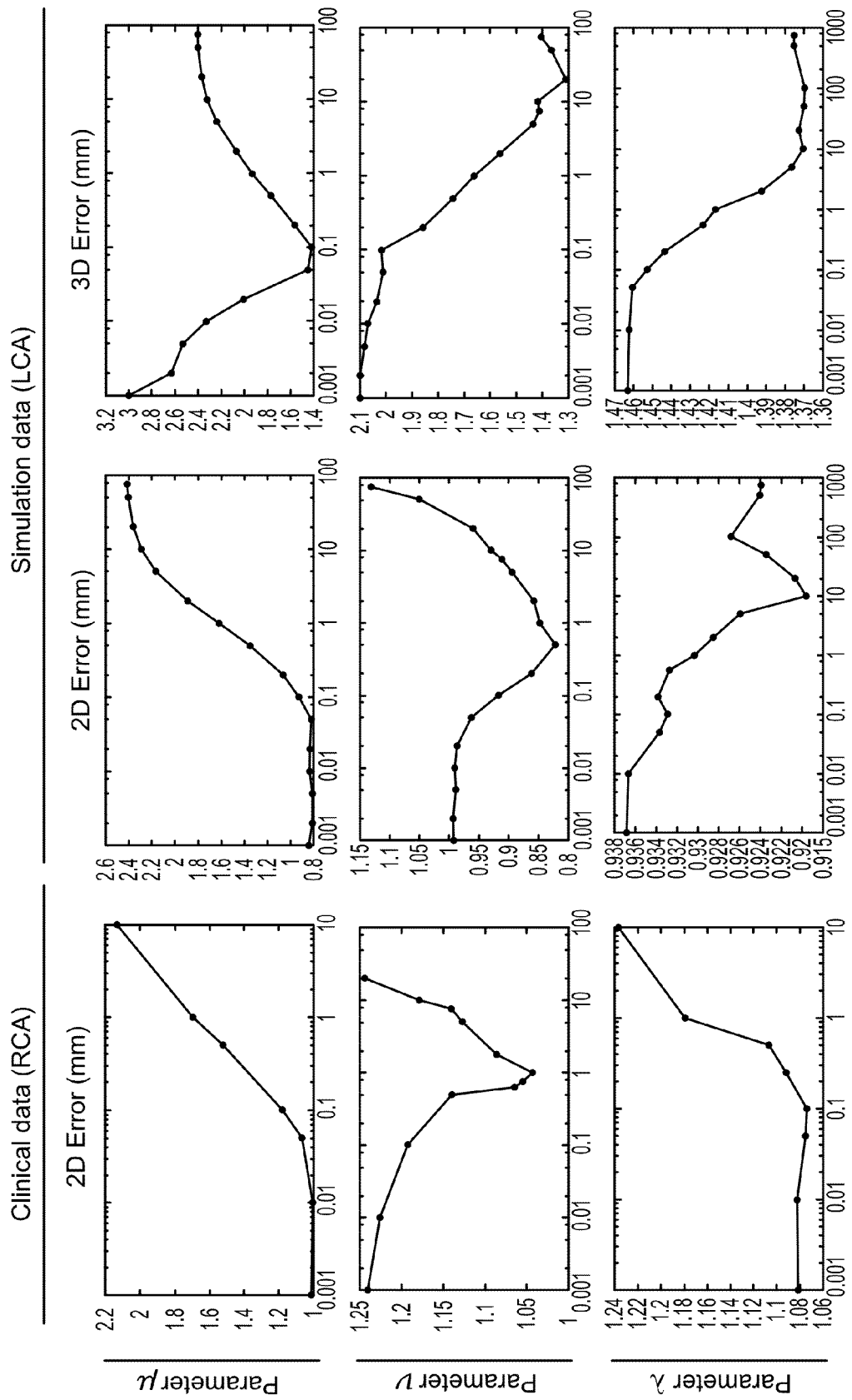
FIG. 8 shows the mean 2D and 3D errors after a nonrigid registration method according to an embodiment of the invention.

According to an embodiment of the invention, three parameters μ, υ, and λ govern the behavior of EQ. (12) and can be selected for a specific task. Starting from a certain parameter set (μ=0.10, υ=10.0, λ=1.0), some insight about the behavior of method can be acquired by varying each value individually, and by computing the mean 2D projection error and the 3D error, described in detail below. This methodology has been applied to the patient 4 of the clinical dataset, following an affine alignment, and also to a dataset with synthetic deformations, described below. The former depicts a RCA, and the latter, a LCA. FIG. 8 shows the mean 2D and 3D error after nonrigid registration, where the top row illustrates data for parameter μ, the middle row illustrates data for parameter υ, and the bottom row illustrates data for parameter γ. For each graph, one of the parameters was varied, while the others two were kept fixed. The default parameter values are: μ=0.1, υ=10.0, and λ=1.09. The x-axis scales are logarithmic.

Parameter μ can constrain the overall displacement, and the 2D error curves suggest that the computed error increases with its value. However, the 3D error curve indicates a minimum when μ has a value in the 0.05-0.10 range. In addition, the convergence rate increases with μ. For example, the registration used to produce the graph in FIG. 8 (top left) converged in 4880, 3320, and 1100 iterations with μ={0.001, 0.01, 0.1} respectively.

Parameter υ can control the rigidity of the model. In this case, the 2D projection error suggests using a value in the 0.50-2.00 range. However, the 3D error curve shows that higher values might result in a more accurate registration. Embodiments of the invention use exemplary, non-limiting values of υ=10.0, which appears to be a good trade-off between the 2D and 3D error curves.

Figure 7:
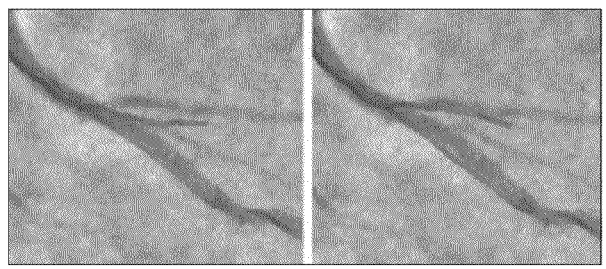
FIG. 7, which illustrates the behavior of the parameter λ in a nonrigid registration method, according to an embodiment of the invention.

Parameter λ can balance the myocardium constraint, and can preserve the general integrity of the global shape. With a clinical RCA dataset, it was found that high value can overly constrain the motion, which results in increased errors. However, with a simulated LCA dataset, the situation appears almost inversed, as λ values of up to 10.0 are clearly beneficial. This situation can most likely be explained by the differences in the nature of the deformations that affects the LCA and RCA datasets. An exemplary, non-limiting value λ=0.5 was selected because it represents a trade-off in the error measures, and because it improves the visual appearance in many cases, as depicted in FIG. 7, which illustrates the behavior of the parameter λ, in the nonrigid registration method, for λ=0 on the left, and λ=0.3 on the right. Different values of λ can be used for the LCA and RCA datasets. Embodiments of the invention used the following exemplary, non-limiting parameters in all subsequent experiments: μ=0.5, υ=10.0, and λ=0.5, unless stated otherwise.

Figure 9:
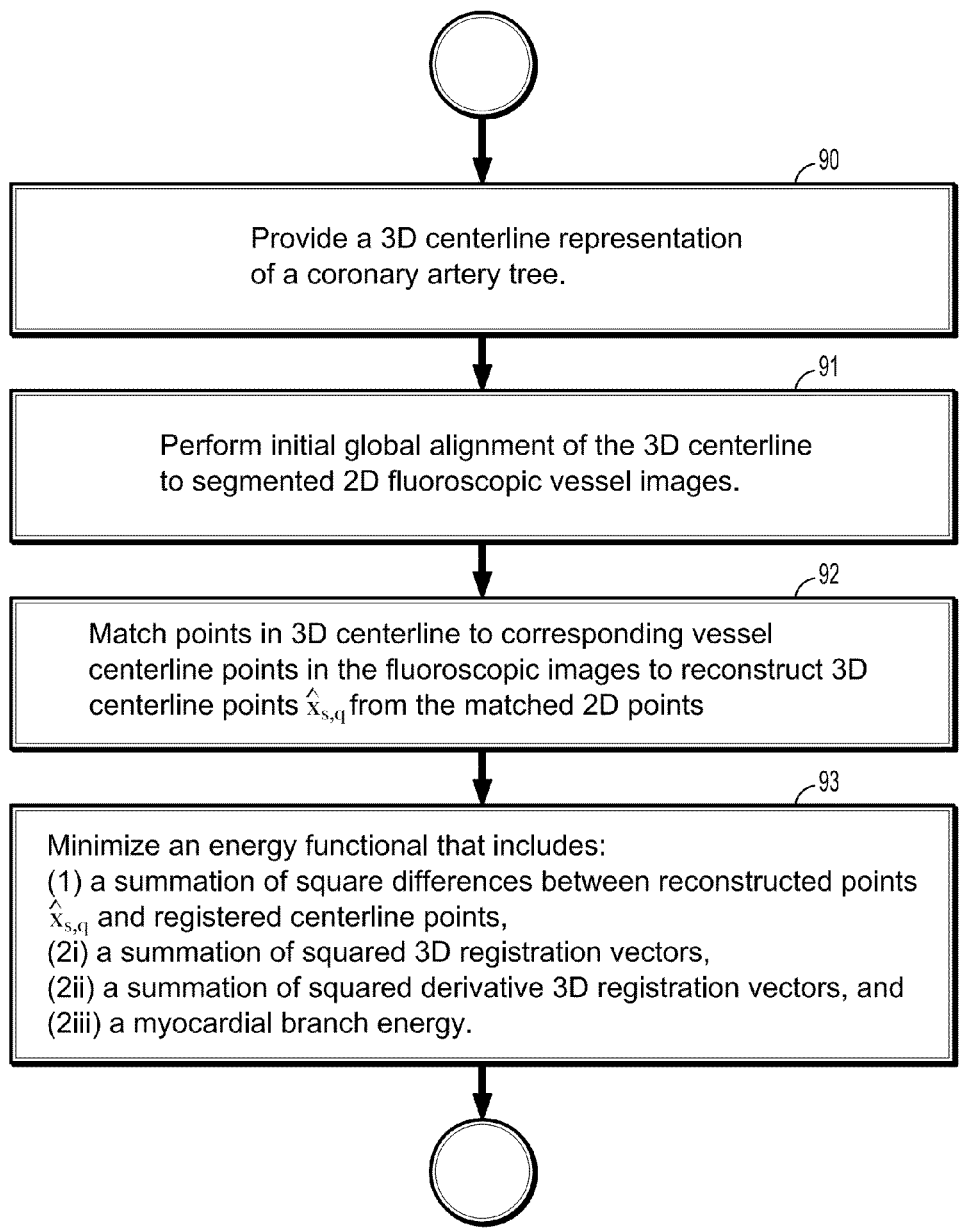
FIG. 9 is a flowchart of a non-rigid 2D/3D registration method according to an embodiment of the invention.

A flowchart of a non-rigid 2D/3D registration method according to an embodiment of the invention is presented in FIG. 9. A method starts at step 90 by being provided with a 3D centerline representation of a coronary artery tree segmented from a pre-operative image volume, such as a CTA volume. A method continues at step 91 by performing an initial global alignment of a 3D centerline representation of a coronary artery tree to 2 or more segmented 2D fluoroscopic images of coronary vessels. As described above, this global alignment can be performed in embodiments by successive translation-only transformation, rigid transformation, and affine transformation. At step 92, points in the 3D centerline are matched to corresponding vessel centerline points in the fluoroscopic images to reconstruct a 3D centerline from the matched 2D points, as described above with reference to FIG. 4. Then at step 93, non-rigid registration is performed by minimizing an energy functional that includes a weighted summation of square differences between reconstructed points $\hat{x}_{s,q}$ and registered centerline points, a summation of squared 3D registration vectors, a summation of squared derivative 3D registration vectors, and a myocardial branch energy.

Experimental Results

Algorithms according to embodiments of the invention have been implemented in C++ within a prototyping environment that shows an overlay of a registered model with live fluoroscopy images during interventions. Note that the implementation in C++ is exemplary and non-limiting, and implementations in other computer languages are possible in other embodiments of the invention. All global optimizers are single threaded. A nonrigid registration method according to an embodiment of the invention is partly multithreaded using OpenMP. Run times given are for an i7 Q820 Quad Core Intel CPU. The presented run times do not account for 2D image segmentation. On average, this operation has a run time 0.200 s per image, with a standard deviation of 0.088 s. Experiments on both simulated and clinical data are presented.

Simulations

Figure 10:
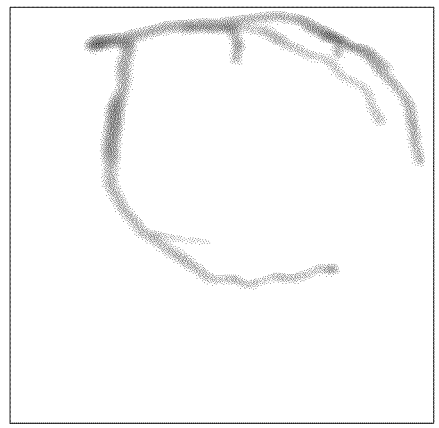
FIGS. 10(a)-(d) illustrates the creation of the DRRs, according to an embodiment of the invention.
Figure 10:
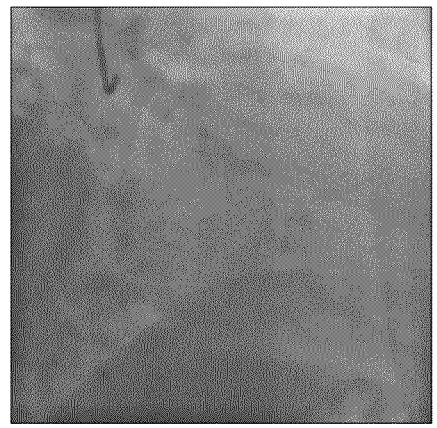
Figure 10:
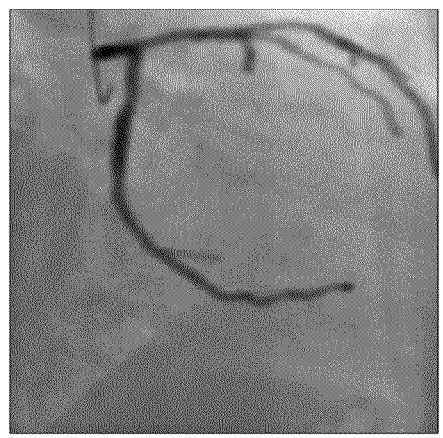
Figure 10:
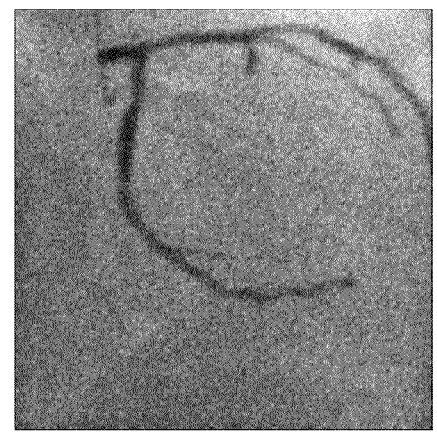

Alignment and registration methods according to embodiments of the invention have been tested on a set of simulations, allowing characterizations of the performance of the various algorithms according to embodiments of the invention in a somewhat ideal scenario, and also to evaluate the 3D registration error, which is not possible using clinical data. A centerline was registered with a pair of digitally reconstructed radiographs (DRR), of size 512×512 pixels with a resolution of 0.345 pixel/mm, that were generated as follows: (1) the coronary arteries segmented in the CT volume were projected onto the simulated fluoroscopic planes, and (2) the inverse of the resulting projections was subtracted from the reference background images. FIGS. 10(*a*)-(*d*) illustrates the creation of the DRRs: the coronaries segmented in the CT volume are projected onto a simulated radiographic plane in FIG. 10(*a*); this image is then subtracted from a real contrast-free angiography, shown in FIG. 10(*b*) to produce the final DRR in FIG. 10(*c*). In one experiment, Gaussian noise is added, shown in FIG. 10(*d*), here with σ=50. The simulations were used in three scenarios described below. Since all the transformations are known during the simulation, all the 3D errors presented herein are exact point-to-point errors. It should be noted that this style of error will penalize the compression or expansion of a segment, even when this produces no visual effect. It is thus more strict than most TRE formulations. The 2D error is computed as described in above, using the projection of the true centerline as the reference segmentation.

Figure 11:
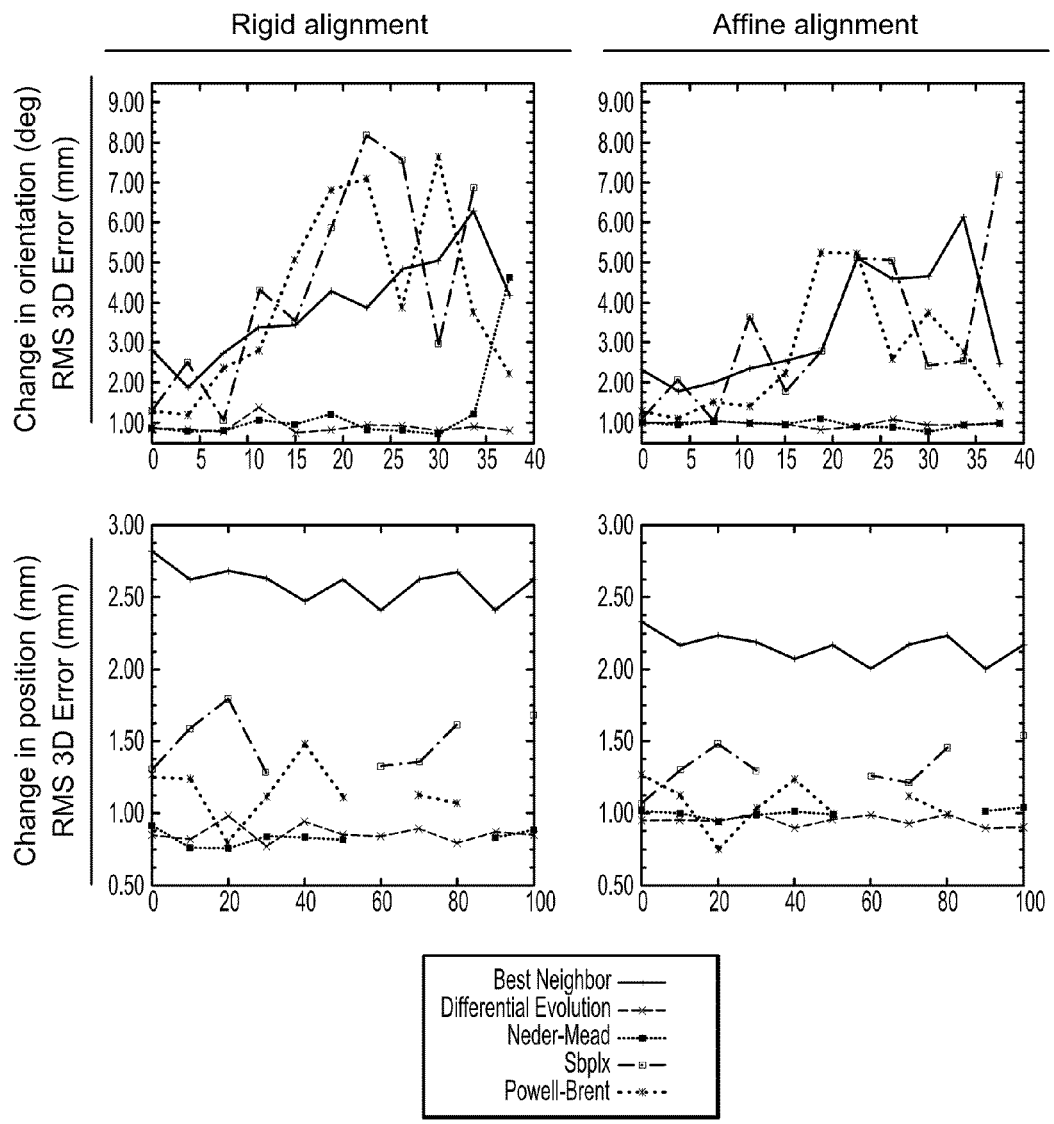
FIG. 11 illustrates the performance of the optimizers with respect to a perturbation of the initial position, according to an embodiment of the invention.

(1) Dependence on the Initial Solution: The centerline is registered with a pair of DRRs, starting from different initial positions. This serves to quantify the sensitivity of the global alignment methods to a perturbation of the initial position, and equally, to a miscalibration of the C, $P_1$, $P_2$, or T rigid transformation matrixes. The selected initial positions are as follows. Let $T_0$ be the transformation given by the calibration of the apparatus. Then, the 12 initial points are $T_0$ displaced by ±α mm along the three principal axes, and $T_0$ rotated by ±β deg around the three principal axes. Embodiments used: α∈10×{0, 1, ..., 6} mm, and β∈3.75×{0, 1, ..., 6} deg. The rms error was computed for all results with the same level of perturbation (translation or rotation). FIG. 11 illustrates the performance of the optimizers with respect to a perturbation of the initial position, where the left column graphs present rigid alignment results, the right column graphs present affine alignment results, the top row presents results for changes in orientation, and the bottom row presents results for changes in position. In the bottom row, the missing points represent rms error >3 mm. The results depicted in FIG. 11 show that all algorithms according to embodiments of the invention presented are satisfactory when the rotational perturbation is less than 10 deg.

Figure 12:
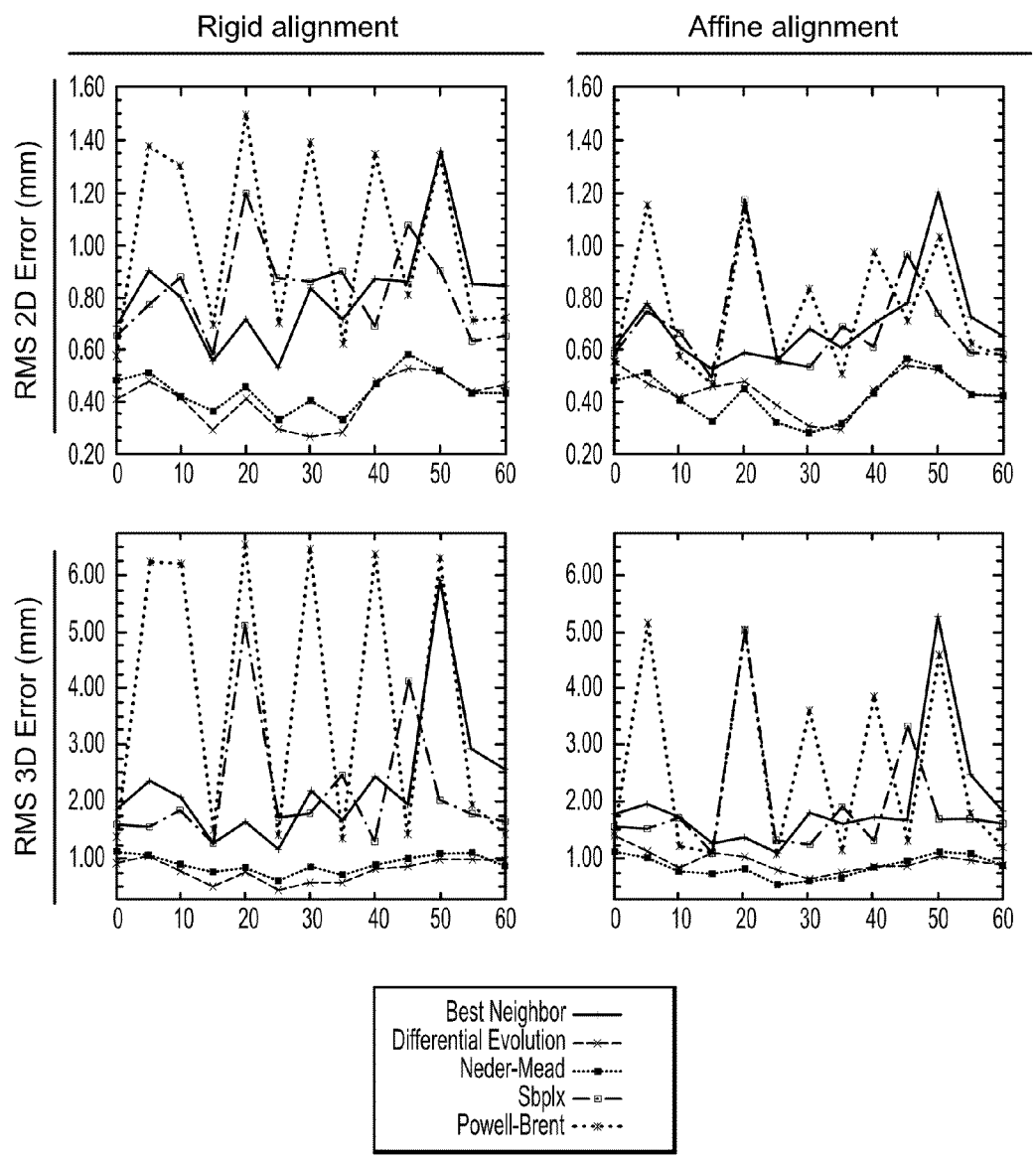
FIG. 12 illustrates the performance of the optimizers with respect to the standard deviation of the input DRR noise, according to embodiments of the invention.

(2) Robustness to Image Noise: Various amounts of Gaussian noise with variance σ∈{5, 10 ... 60} were added to the fluoroscopic images, to assess the impact of image quality on the performance of method according to embodiments of the invention. Each optimizer was run from 13 initial positions for each noise level (as above, with α=5 mm, and β=7.5 deg, plus $T_0$). FIG. 12 illustrates the performance of the optimizers according to embodiments of the invention with respect to the standard deviation of the input DRR noise, for each noise level, where the left column graphs present rigid alignment results, and the right column graphs present affine alignment results. A Gaussian white noise model with σ∈[0,60] was used. The results of this test tend to demonstrate that methods according to embodiments of the invention are not sensitive to the presence of Gaussian noise in the fluoroscopies. The 2D and 3D error level shows very little correlation with the amount of added noise, even at levels as high as σ=60 that are seldom observed in a clinical setting. This is an indication of the good performance of the selected 2D segmentation algorithm.

Figure 13:
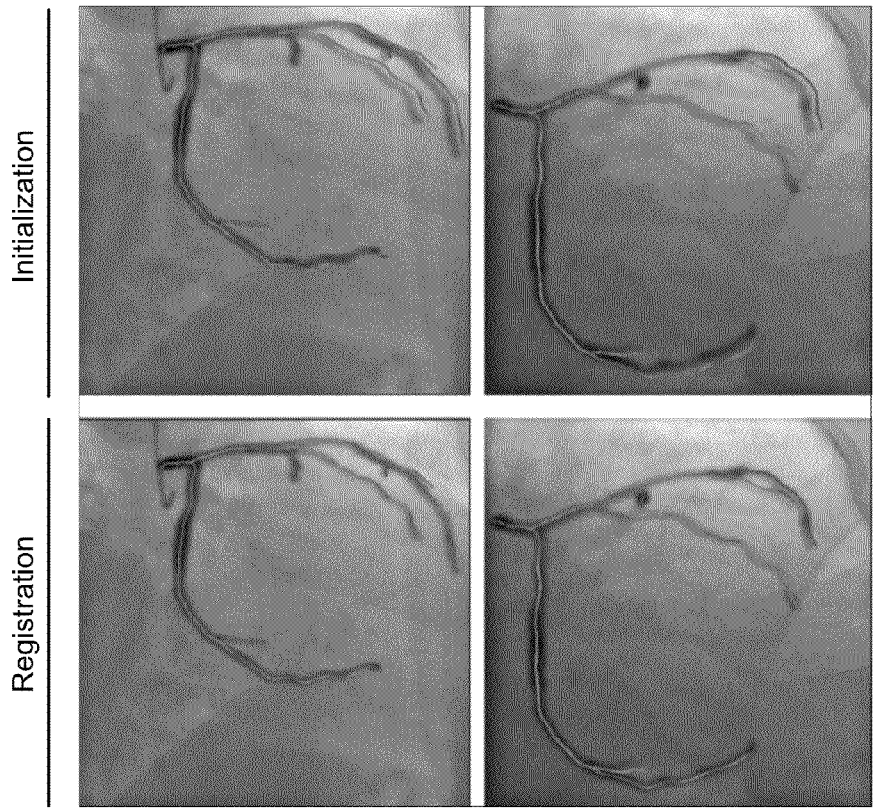
FIG. 13 shows some sample nonrigid registrations with simulated data, according to embodiments of the invention.
Figure 14:
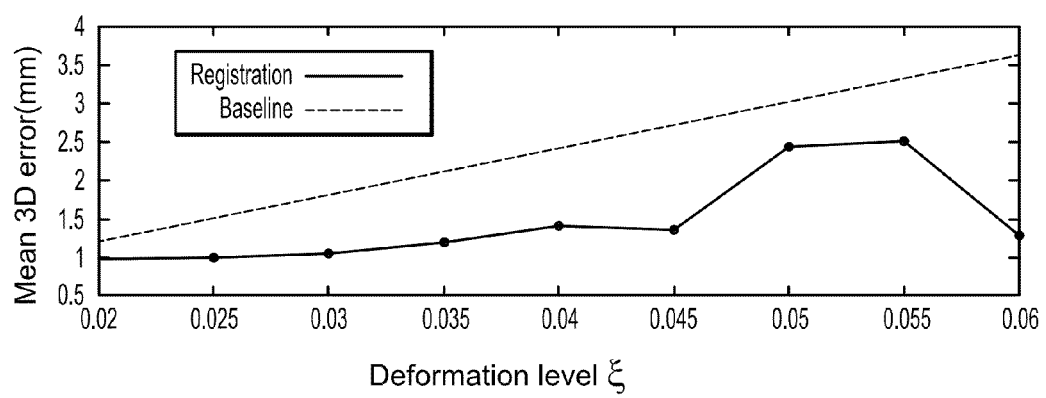
FIG. 14 is a graph of the residual 3D error with respect to the simulated nonrigid deformation level, according to embodiments of the invention.

(3) Nonrigid Deformation: In these simulations, a centerline was deformed using a 3×3×3 node thin plate spline (TPS) deformation model covering the CT-scanned region. Each TPS node is moved toward the center node by a factor depending on the deformation parameter 4. The nine left nodes were shifted by a factor of 4, the nine center nodes by 0.5, and the nine right nodes by 24. FIG. 13 shows some sample nonrigid registrations with simulated data. The top row shows the initial positions; the bottom row shows the final positions. A nonrigid registration algorithm according to an embodiment of the invention was tested for deformation levels $\xi \in \{0.020, 0.025, \ldots, 0.060\}$, which resulted in mean and maximum 3D displacements of the centerline of [1.209-3.638] mm and [2.472-7.416] mm respectively. A nondeformed centerline curve was used as the initial solution, and no global alignment was performed before applying the nonrigid registration algorithm. A quantitative evaluation is presented in FIG. 14, which is a graph of the residual 3D error with respect to the simulated nonrigid deformation level, where the baseline corresponds to the initial solution error. It was found that this algorithm gives good results up to the level $\xi = 0.045$. At this point, it reduces the average 3D error from 2.721 mm to 1.198 mm, which is qualitatively significant, as shown in FIG. 13. As will be demonstrated herein below, this level of performance is appropriate in a clinical scenario.

Clinical Data

Five datasets were used for the experiments presented in the following sections. Each dataset includes one CTA scan acquired at end-diastole (datasets 1 and 3) or end-systole (datasets 2, 4, and 5), and one biplane X-ray fluoroscopy recording. The two modalities are temporally aligned using ECG gating, and the coronary arteries were semi-automatically segmented in the CTA by a specialist. The mean 3D inter-point distances of the segmented centerlines were in the [1.36-1.60] mm range. The angiograms image the left coronary arteries (LCA) in three cases and the right coronary artery (RCA) in the other two. The image size is 512×512 in all cases, and the image resolution is {0.345, 0.279, 0.279, 0.216, 0.279} mm/pixel for dataset 1 to 5, respectively. The acquisition rate is 15 fps. Standard C-Arm calibration matrices were used. Although not required, calibration matrices and were kept constant during acquisition, although they are different for each dataset. The CTA and fluoroscopy exams had been prescribed to the patient for the treatment of a coronary disease.

The assessment of the performance of an alignment and registration algorithm according to an embodiment of the invention was quantified using a mean 2D projection error $$\text{Err}(\chi, \bar{x}_{s,q}) = \frac{1}{2M} \sum_{n=1}^{2} \sum_{s,q} D_{S_n}(\Pi_n(\chi(x_{s,q}))) \qquad (13)$$

where M is the total number of points in the 3D centerline model, and $D_{S_n}$ is the distance transform of the reference 2D segmentation $S_n$, which was obtained by manual tracing on top of the corresponding fluoroscopy image.

Global Alignment: Evaluation of the Performance of the Optimizers

Embodiments of the invention tested seven local (L) and two global (G) algorithms for global alignment. These algorithms are briefly described here.

Best Neighbor (L): At each iteration, a step in all principal directions of the parameter space is considered. The best move is applied, and a new iteration begins. When no move improves the solution, the step is halved.

Nelder-Mead (also known as Downhill Simplex) (L): A classic numerical optimization method that minimizes an m-dimensional function by evaluating the function value at the m+1 vertices of a general simplex (or polytope). At each iteration, the vertex with the worst value is replaced by another one using a reflection operation followed by either an expansion or a contraction operation. See Nelder, et al., "A Simplex Method For Function Minimization," *Comput. J.*, Vol. 7, No. 4, pp. 308-313, 1965.

Sbplx3 (L): This method decomposes the problem in a low dimensional subspace, and uses the Nelder-Mead algorithm to perform the search. See S. G. Johnson, "The Nlopt Nonlinear-Optimization Package", available online: http://ab-initio.mit.edu/nlopt.

Cobyla (L): The Constrained Optimization By Linear Approximation method works by constructing linear-approximations of the cost function and constraints using vertex simplexes, and minimizes this approximation. The radius of the simplex is progressively reduced, while maintaining a regular shape. See Powell, "Advances in Optimization and Numerical Analysis" in *A Direct Search Optimization Method That Models the Objective and Constraint Functions by Linear Interpolation*, Dordrecht: Kluwer Academic, 1994, pp. 51-67, and Powell, "Direct Search Algorithms For Optimization Calculations", Dept. Appl. Math. Theoretical Phys., Cambridge Univ., U.K., Tech. Rep., 1998.

Bobyqa (L): Each iteration of the Bound Optimization By Quadratic Approximation method use a quadratic approximation of the cost function constructed, typically by considering interpolation point. The trust region is progressively reduced until there is no further improvement. See Powell, "The BOBYQA Algorithm For Bound Constrained Optimization Without Derivatives", Centre Math. Sci., Cambridge Univ., Cambridge, U.K., Tech. Rep., 2009.

Powell-Brent (L): At each iteration, a succession of exact 1D line optimizations is performed using Brent's method. The solution is updated using Powell's method of conjugate search directions. See Brent, *Algorithms for Minimization Without Derivatives*, Englewood Cliffs, N.J.: Prentice-Hall, 1973, and Powell, "An Efficient Method For Finding The Minimum Of A Function Of Several Variables Without Calculating Derivatives," *Comput. J.*, Vol. 7, No. 2, pp. 155-162, 1964.

Praxis (L): Brent's PRincipal-AXIS method is a refinement of Powell's method of conjugate search directions, in Brent, *Algorithms for Minimization Without Derivatives*, Englewood Cliffs, N.J.: Prentice-Hall, 1973.

Differential Evolution (G): This is a population-based stochastic global optimization method, the main feature of which is the use of the vector of the difference between pairs of individuals as the basis for the population evolution. See Storn, et al., "Differential Evolution—A Simple And Efficient Heuristic For Global Optimization Over Continuous Spaces," *J. Global Optimizat.*, Vol. 11, pp. 341-359, 1997.

Direct (G): This global optimization algorithm is designed for problems with finite bound constraints, as is the case here. The parameter space is systematically and deterministically searched by dividing it into smaller and smaller hyperrectangles. See Jones, et al., "Lipschitzian Optimization Without The Lipschitz Constant," *J. Optimizat. Theory Appl.*, Vol. 79, pp. 157-181, 1993.

The free parameters of each algorithm have been adjusted in accordance with the recommendations of their original author or implementer. The implementations of the following algorithms are taken from the NLopt library at http://ab-inito.mit.edu/nlopt: Praxis, SBPLX, Cobyla, Bobyqa, and Direct. To not change the nature of the problem, generous bounds have been fed to the optimizers: ±200 mm for the translation parameters, ±45 deg for the rotation parameters, [0.5, 1.5] for the scale parameters, and ±360 deg for the scale-rotation parameters [$A_{10}{}^{12}$ in EQ. (2)].

The same set of stopping criteria was used for all the optimizers, except Differential Evolution. Specifically, the optimizers were allowed to run until, after one optimization step, either (1) the value of the cost function was reduced by less than $1\,e^{-14}$ or (2) the value of the optimized parameter changed less than $1\,e^{-4}$ mm for the translation parameters, $1\,e^{-5}$ rad for the rotation parameters, and $1\,e^{-7}$ for the sealing parameters. The parameter tolerances have an intuitive interpretation. For example, a difference in translation of $1\,e^{-4}$ mm corresponds to a maximal displacement of $\frac{1}{2000}$ of a pixel on an image plane. As to the Differential Evolution optimizer, since the convergence of a stochastic algorithm is not regular, embodiments of the invention allowed the optimizer run until it had evaluated the cost function 100000 times, that corresponds to a median run of approximately 10 s.

The performance of the nine optimizers in minimizing a global alignment energy according to an embodiment of the invention as expressed in EQ. (1) and in producing good quality 2D/3D alignment were assessed using the following experimental setup. For each of the five patient datasets, three pairs of fluoroscopic images were considered: the images temporally aligned with the CTA acquisition, and the previous and next adjacent frames. Temporal alignment helps to minimize the observable differences between the two modalities, thereby reducing the risk of failing a registration. This is reasonable clinically, as it would allow the registration matrix to be updated approximately once every second, in order to improve surgical guidance. In addition, to test the robustness of the optimizers, 13 different initial points were used for the initialization. Let $T_0$ be the transformation given by the calibration of the apparatus. The 13 initial points are $T_0$, $T_0$ displaced by ±5 mm along the three principal axes, and $T_0$ rotated by ±7.5 deg around the three principal axes. A total of 5×3×13=195 experiments were thus conducted for each optimizer tested. As discussed above, EQ. (1) can be minimized by successively using: (1) a translation-only transformation, (2) a rigid transformation, and (3) an affine transformation.

An analysis of the root-mean-square mean residual energies left after minimizing with each of the three transformation models for all 9 optimizers reveals that the best algorithms for minimizing the energy function with the affine transformation model are the following: Differential Evolution, Neder-Mead, Powell-Brent, Best Neighbor, Sbplx, and Direct. When the mean 2D projection error is considered, the order changes slightly: Differential Evolution, Powell-Brent, Best Neighbor, Sbplx, Neder-Mead, and Direct. The difference can probably be attributed to the discrepancy between the automatic segmentation used in the alignment process, and the manual segmentation used for computing the error. Nevertheless, the performance of the top ranking algorithms appears to be satisfying. The relatively poor performance of the Bobyqa and Cobyla algorithms might be an indication that the shape of the energy function is not well represented by their quadratic and linear models, respectively. The Praxis method appears to be the least appropriate local optimizer for this problem.

The Differential Evolution algorithm was found to be the best performer in term of both the residual energy and the mean 2D error. However, the gains in mean 2D error were marginal for a computational time that is about 100 times longer that of the local algorithms. Still, the median value of the computational time of that optimizer, just under 11 s, might be reasonable for applications that are not time critical. In general, it can be noted that the global optimizers only rarely lead to lower energy or error figures than the best-performing local optimizers. This is an indication that the latter actually finds solutions that are close to the global optimum. It is also worth noting that the global optimizers generally succeed in avoiding the worst solutions. There is also a good correlation between the residual energy and the perceived visual correspondence. Nevertheless, even with the best alignment with the affine transformation model, a relatively large discrepancy exists between the projected centerline and the 2D fluoroscopies. This can probably be attributed to the presence of a non-affine deformation in the dataset due to inaccuracies in the temporal alignment between the modalities, and to shape changes induced by the patient's position changes during the various acquisitions steps.

Comparison of the Global Alignment Method with Nonrigid Registration

Figures 15, 16:
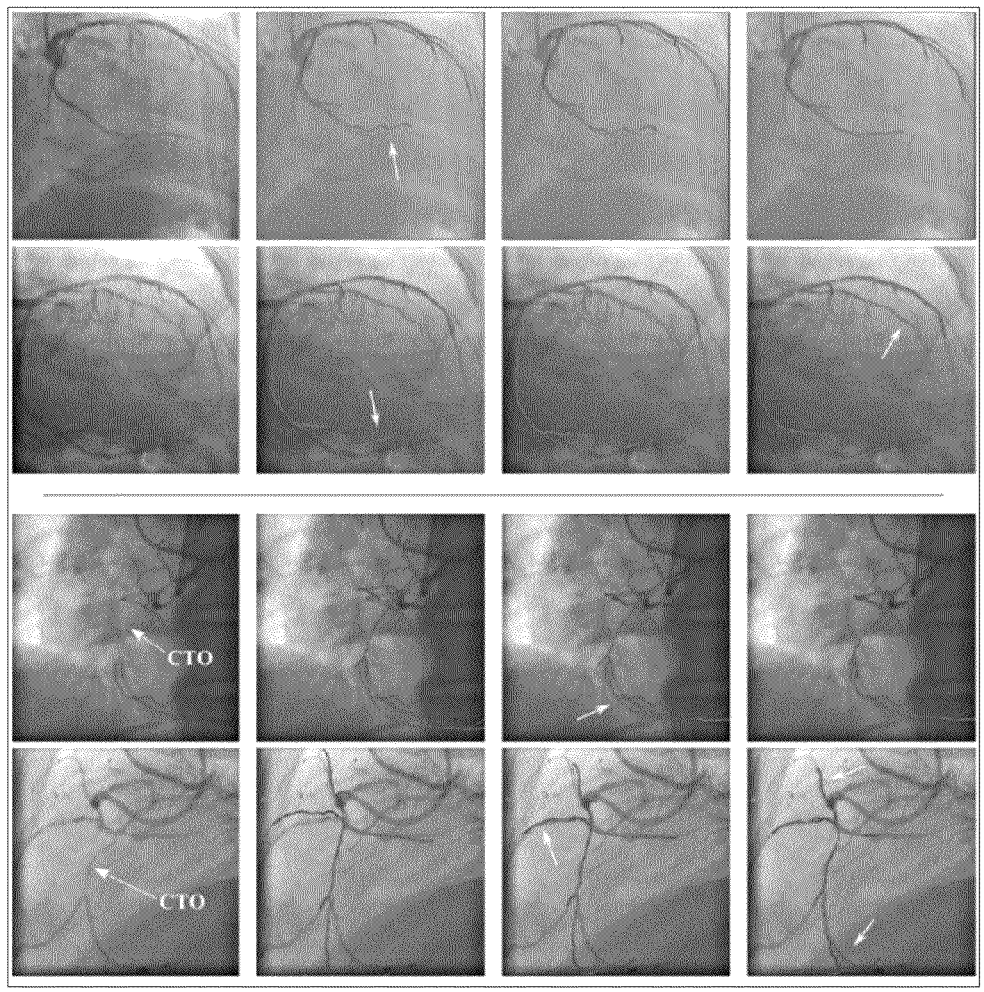
FIG. 15 depicts input images and results after rigid, affine, and nonrigid registrations, according to embodiments of the invention.
FIG. 16 is a table showing the mean residual 2D projection error of the centerline on the two fluoroscopic planes with respect to 2D manual segmentations after rigid, affine, and nonrigid registration for five patients, according to embodiments of the invention.

Detailed global alignment results obtained using the Best Neighbor optimizer are now presented and compared with those obtained after nonrigid registration. In all cases, the centerline model was registered with the fluoroscopic frames that are gated in the same cardiac phase used for the CT reconstruction. The results after translational, rigid, affine, and nonrigid registration are shown for the dataset from three patients in FIGS. 3 and 15, where FIG. 15 shows, from left to right: the input image, the rigid alignment, the affine alignment, and the nonrigid registration. Both biplane images are shown in all cases. The arrows indicate some regions of interest. The mean residual 2D projection error of the centerline on the two fluoroscopic planes with respect to 2D manual segmentations has also been calculated (in millimeters) was calculated after rigid, affine, and nonrigid registration for five patients, with results presented in Table I, shown in FIG. 16. The top and bottom rows of FIG. 15 correspond to Patients 1 and 2 in Table I, respectively. The CTO label in the two lower left image frames of FIG. 15 refers to a chronic total occlusion. The computational times needed for the nonrigid registration were in the range [730-3300] ms, with an average of 1591 ms.

The mean 2D projection errors and their standard deviations decrease, or stay approximately constant, as the complexity of the model increases. However, the relative contribution of the rigid, affine, and nonrigid transformation model varies from one dataset to another. This can be explained by the nature of the deformation presented by each individual case, which is linked to the patient's position, the interval between the CTA and 2D fluoroscopy acquisitions, and the acquisition protocol. Also, patient respiration can cause non-rigid heart deformation. The accuracy of the temporal alignment by ECG gating is also important, since the beating of the heart is also a source of nonrigid deformation. The maximal error also tends to decrease with model complexity, but it sometimes stays stable. In those cases, the performance of the registration algorithm might be limited by an incomplete 2D segmentation, as computed by an automatic segmentation method. In fact, in regions where little or no information is available, a nonrigid registration method according to an embodiment of the invention should alter the centerline as little as possible. This characteristic is desirable in situations where parts of the structure are poorly visible on the X-ray fluoroscopic images, as is sometimes the case with chronic total obstruction (CTO). For an example, the bottom row of FIG. 15 shows that the centerline is well aligned over and under the CTO, but there is little deformation where the contrast is poor.

Global Alignment in the Multi Frame Scenario

Figure 17:
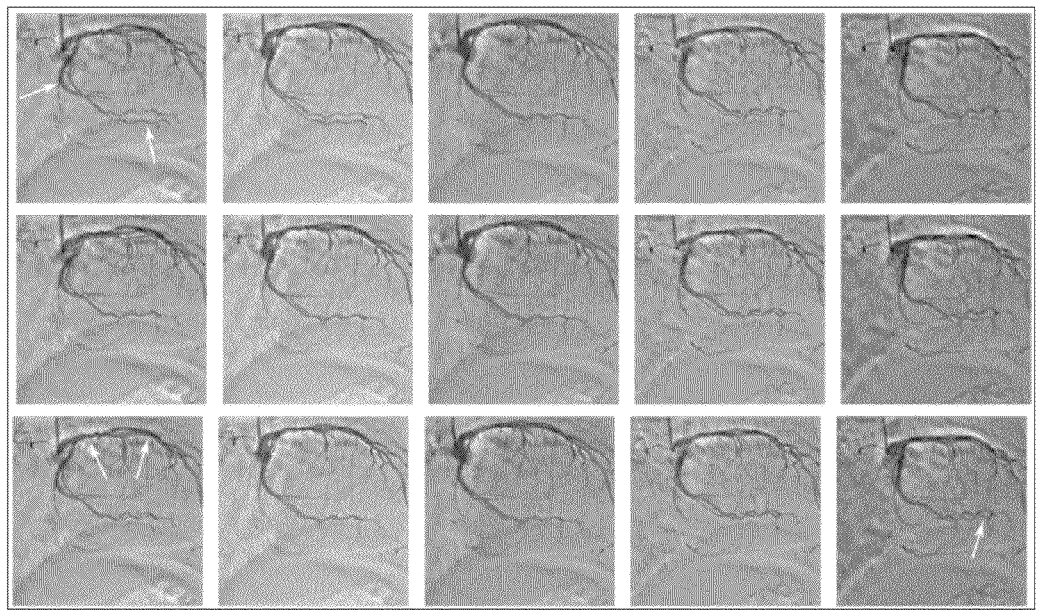
FIG. 17 shows registration over a sequence of frames, according to embodiments of the invention.

Another potentially useful scenario, beyond the alignment of a centerline with a biplane pair, is the alignment of a centerline with a temporal sequence of frames from biplane angiography. The performance of a global alignment method according to an embodiment of the invention in the multi-frame scenario cam be demonstrated using a sequence of 11 biplane frames from the Patient 1 LCA dataset. Global alignments were computed using the rigid and affine transformation models according to embodiments of the invention. The inter-frame regularization parameters $\gamma$ in EQ. (5) varied between 0.0 and 1.0. The Best Neighbor optimizer was used in this case since it was found to be the most effective at minimizing the cost function of EQ. (5). Sample results obtained are shown in FIG. 17, which shows registration over a sequence of frames. In FIG. 17, the top row depicts a rigid transformation model, with $\gamma=0.1$ and $E^*_{Multi}=120.284$, the middle row depicts an affine transformation model with $\gamma=0$ and $E^*_{Multi}=119.356$, and the bottom row depicts a regularized affine transformation model with $\gamma=0.1$ and $E^*_{Multi}=116.905$, where $E^*_{Multi}$ corresponds to the first right-hand term of EQ. (5). The arrows indicate some regions of interest. Computational times were 39 s, 89 s, and 91 s, for the experiments presented in the top, middle, and bottom rows, respectively. As anticipated, it was found that using the affine transformation model led to better qualitative results than using the rigid one. Using regularization ($\gamma=0.1$) also improved the results when using the affine transformation model. With large regularization values, $\gamma > 1.0$, the stiffness of the model increases, and the optimizers cannot find a local minima that is far from the initial position. Preliminary investigation suggests that domain specific optimizers might achieve better results, e.g., by allowing the parameters o change in a coordinated manner. Nevertheless, a setup according to an embodiment of the invention was sound to be appropriate for tracking the alignment transformations of the LCA during most of the cardiac cycle. Experiments on the RCA datasets did not lead to convincing. results. In fact, even though a global alignment procedure according to an embodiment of the invention works, the amount of nonrigid deformation sustained by the RCA during the cardiac cycle renders the affine model ineffective except when the CTA and X-ray acquisition are in close temporal alignment.

Semiautomatic Tracking of the Right Coronary Artery

Figure 18:
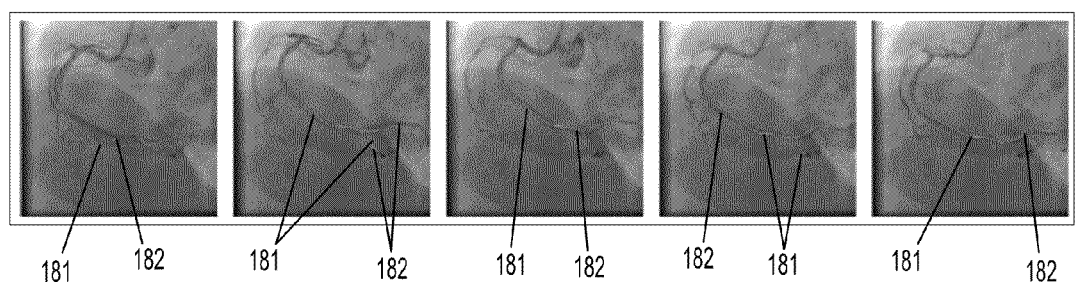
FIG. 18 depicts tracking the RCA through several frames of one cardiac cycle, according to embodiments of the invention.

In this experiment, a semiautomatic procedure based on a nonrigid registration method according to an embodiment of the invention has been used to track the RCA. Starting from the gated frame, a global alignment and nonrigid registration according to an embodiment of the invention are performed. This deformed centerline model according to an embodiment of the invention is then used by the operator as an initial model and position for the next pair of fluoroscopic frames. This process is repeated for all frames over one cardiac cycle, as presented in FIG. 18, which shows, from left to right: at the gated frame, and at +4, +6, +8, and +10 frames. The initial curve is 181, and the registered curve is 182. As can be seen, this procedure permits successful tracking of the RCA during one cardiac cycle. Because this experiment has been conducted before the simulation study, a slightly different set of parameters was used: $\mu=0.05$, $\upsilon=5.0$, and $\lambda=0.1$. The required amount of time is about 15 min, which is reasonable in an offline setting.

Discussion

Based on experiments on clinical data, it appears that the following local optimizers give good results in a short time (median<105 ms, max<950 ms): Neder-Mead, Powell-Brent, Best Neighbor, and Sbplx. Considering also the simulation results, the Neder-Mead algorithm was the best overall performer. The two global optimizers only rarely led to major improvements in the result and required a computational time orders of magnitude higher. Disregarding computational time, the Differential Evolution algorithm generally returned the best solution. When using a local optimizer, the alignment time was consistently under 1 s, which makes the method suitable for use during an intervention. The advantage of using an affine transformation instead of a rigid transformation is dependent on the nature of the dataset and can be significant in some cases. Overall, it was found that the global alignment procedure is appropriate for use on both LCA and RCA datasets, when the 3D and 2D modalities are temporally aligned using ECG gating. The experiment on the dataset from a CTO patient demonstrates the benefit of a method according to an embodiment of the invention when applied to similar clinical cases. A method according to an embodiment of the invention can also help with intervention guidance by augmenting the 2D imagery with the 3D geometry segmented from a CTA acquisition, thereby greatly reducing the ambiguities inherent in the interpretation of the 2D images.

As for nonrigid registration, the regularizers included in a deformation model according to an embodiment of the invention enable the management of regions with missing data (e.g., Patient 2 in FIG. 15) by deforming the centerline a minimum amount to ensure coherence with the rest of the structure. No excessive deformation or straightening will occur. The total computational time, which was generally below 3 s, is acceptable for interactive applications. A nonrigid registration method according to an embodiment of the invention can snap the centerline to adjacent 2D structures when started from an appropriate initial point, making interpretation of the 2D images easier, especially for difficult low contrast CTO cases. This also makes it possible to present an updated 3D model alongside the operational images to provide an improved perception of the 3D space.

Finally, experiments using multiple X-ray biplane angiography frames showed that a multiframe global alignment method according to an embodiment of the invention works well on LCA datasets, and an interframe regularizer according to an embodiment of the invention leads to improved results. A nonrigid semiautomatic tracking method according to an embodiment of the invention can handle cases with greater nonrigid deformations, such as with non-temporally aligned RCA datasets, and was applied to one such dataset. A semi-automatic method according to an embodiment of the invention required approximately 15 min of interaction for a sequence covering one heart beat, which seems reasonable for practical offline applications.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 19:
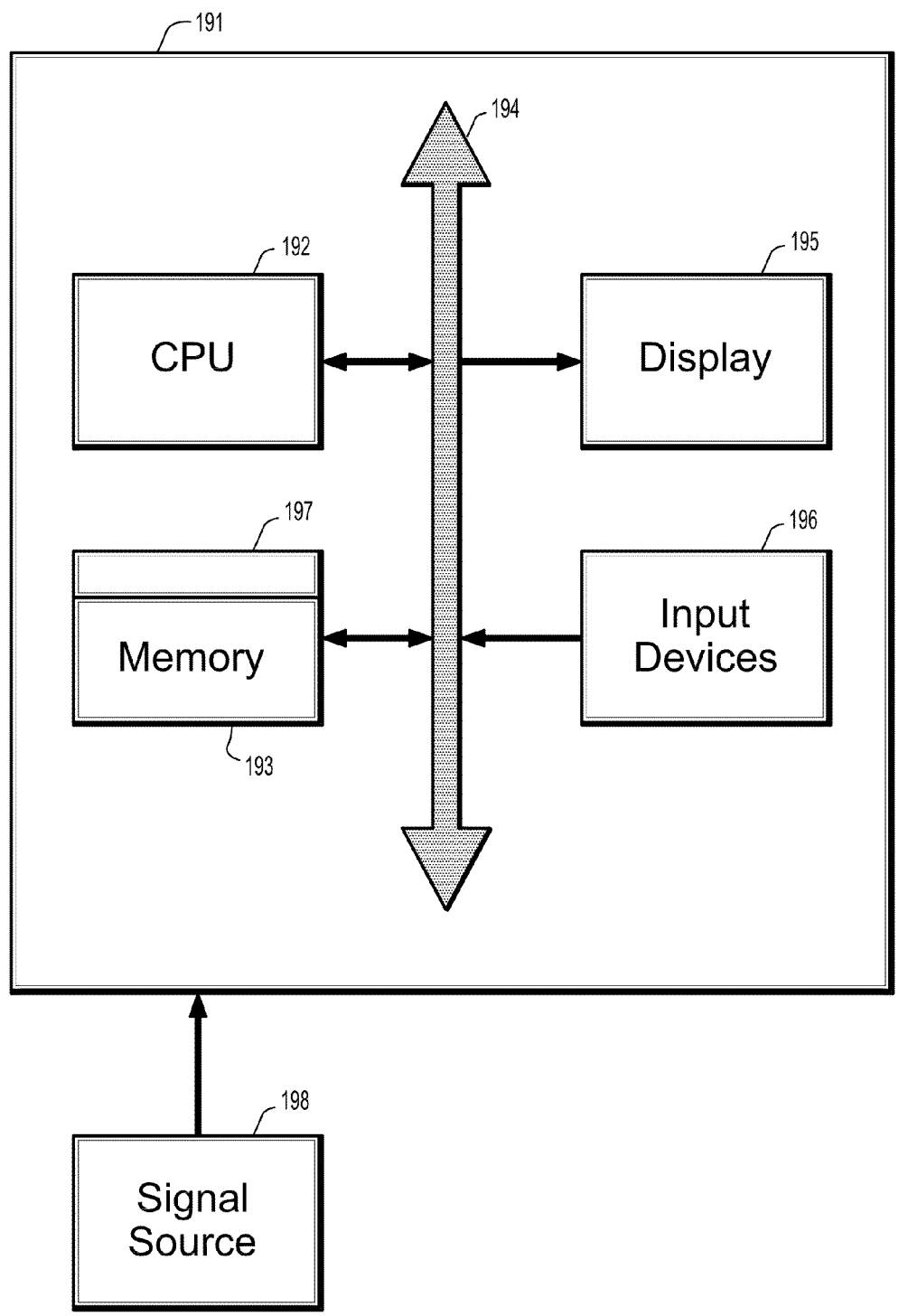
FIG. 19 is a block diagram of an exemplary computer system for implementing a method for non-rigid 2D/3D registration of coronary artery models with live fluoroscopy images, according to an embodiment of the invention.

FIG. 19 is a block diagram of an exemplary computer system for implementing a method for non-rigid 2D/3D registration of coronary artery models with live fluoroscopy images according to an embodiment of the invention. Referring now to FIG. 19, a computer system 191 for implementing the present invention can comprise, inter alia, a central processing unit (CPU) 192, a memory 193 and an input/output (I/O) interface 194. The computer system 191 is generally coupled through the I/O interface 194 to a display 195 and various input devices 196 such as a mouse and a keyboard. The support circuits can include circuits such as cache, power supplies, clock circuits, and a communication bus. The memory 193 can include random access memory (RAM), read only memory (ROM), disk drive, tape drive, etc., or a combinations thereof. The present invention can be implemented as a routine 197 that is stored in memory 193 and executed by the CPU 192 to process the signal from the signal source 198. As such, the computer system 191 is a general purpose computer system that becomes a specific purpose computer system when executing the routine 197 of the present invention.

The computer system 191 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for non-rigid registration of digital 3D coronary artery models with 2D fluoroscopic images during a cardiac intervention comprising the steps of:
   providing a digitized 3D centerline representation of a coronary artery tree, wherein the 3D centerline comprises a set of S segments composed of $Q_S$ 3D control points;
   globally aligning the 3D centerlines to at least two 2D fluoroscopic images; and
   non-rigidly registering the 3D centerline to the at least two 2D fluoroscopic images by minimizing an energy functional that includes a summation of square differences between reconstructed centerline points and registered centerline points, a summation of squared 3D registration vectors, a summation of squared derivative 3D registration vectors, and a myocardial branch energy,
   wherein the non-rigid registration of the 3D centerline is represented as a set of 3D translation vectors $r_{s,q}$ that are applied to corresponding centerline points $x_{s,q}$ in a coordinate system of the 3D centerline.

2. The method of claim 1, wherein the coronary artery tree has been segmented from the 2D fluoroscopic images, wherein the segmented coronary artery tree is represented as a binarization of each of the 2D fluoroscopic images.

3. The method of claim 2, wherein globally aligning the 3D centerline to the at least two 2D fluoroscopic images comprises:
   performing a translation-only registration of the 3D centerline to the at least two 2D fluoroscopic images;
   performing a rigid registration of the 3D centerline to the at least two 2D fluoroscopic images; and
   performing an affine registration of the 3D centerline to the at least two 2D fluoroscopic images,
   wherein at each step, an energy functional of the form $$E_{Global}^{j}(C \cdot T_j \cdot x) = \sum_n \sum_{s,q} D_{B_n}(\Psi_n \cdot P_n \cdot C \cdot T_j \cdot x)$$

is minimized, wherein
   j labels the translation-only registration, the rigid registration, and the affine registration,
   C is a coordinate transformation between a coordinate system of the 3D centerline and a coordinate system of a 3D imaging device,
   $T_j$ is a coordinate transformation between a coordinate system of the 3D imaging device and a coordinate system of a biplane C-arm that acquires the fluoroscopic images, for the translation-only, rigid, and affine registrations,
   x is a 3D point in homogeneous coordinates, n represents a sum over the fluoroscopic images, s and q label control points on the segments of the 3D centerline,
   $P_n$ is a coordinate transformation between the coordinate system of the biplane C-arm and the coordinate system of the $n^{th}$ fluoroscopic image,
   $\Psi_n$ is a projection operator that projects the 3D point x to the fluoroscopic image, and
   $D_{B_n}(x)$ is a distance between a 2D point on the $n^{th}$ fluoroscopic image and a closest point in the segmented coronary artery tree in the $n^{th}$ binarized image $B_n$.

4. The method of claim 3, wherein transformation matrices $T_j$ are recentered wherein any change in rotation parameters of the transformation matrixes $T_j$ induces a motion that appears to occur around the origin of the coordinate system of the 3D centerline, as opposed to the origin of the coordinate system of the 3D imaging device.

5. The method of claim 3, further comprising:
   providing a time series of F pairs of 2D fluoroscopic images, and
   globally aligning the 3D centerline to each pair of 2D fluoroscopic images by minimizing the energy functional $$E_{Multi}(\chi_f) = \sum_{f=1}^{F} \sum_{n=1}^{2} \sum_{s,q} D_n(\Psi_n \cdot P_n \cdot T_f \cdot C \cdot x_{s,q}) + \gamma \sum_{f=1}^{F-1} D(T_f \cdot C \cdot x_{s,q}, T_{f+1} \cdot C \cdot x_{s,q}),$$

wherein f is a sum over time points, $T_f$ is a transformation for each time point, γ is a predetermined parameter, and $D(T_f \cdot C \cdot x_{s,q}, T_{f+1} \cdot C \cdot x_{s,q})$ is an inter-frame distance.

6. The method of claim 1, further comprising, after globally aligning the 3D centerline to at least two 2D fluoroscopic images, matching points in the 3D centerline to corresponding vessel centerline points in the 2D fluoroscopic images to reconstruct 3D centerline points $\hat{x}_{s,q}$ from the matched 2D points.

7. The method of claim 6, wherein matching points comprises:
    finding a projection x' of each 3D centerline point $x_{s,p}$ on each 2D fluoroscopic image $I_n$ from the global alignment;
    starting from x', searching a segmentation image $B_n$ corresponding to each 2D fluoroscopic image along a line perpendicular to a projection of the 3D centerline on the segmentation image B to find up to two points that may match centerline point $x_{s,p}$;
    selecting a point closest to $x_{s,p}$ as a match point $x_n$;
    using matched points in the fluoroscopic images to reconstruct a 3D centerline point $\hat{X}_{s,q}$ using projective geometry of an imaging system being used for the cardiac intervention.

8. The method of claim 7, wherein the summation of square differences between reconstructed centerline points $\hat{X}_{s,q}$ and registered centerline points $\overline{X}_{s,q}$ is $$E_{Image}(r) = \sum_{s,q} H(x_{s,q})(\hat{x}_{s,q} - \overline{x}_{s,q})^2,$$

wherein $H(x_{s,p}) \mapsto \{0,1\}$ is an indicator function $H(x_{s,p}) \mapsto \{0,1\}$ herein $H(x_{s,p})=0$ if no matching point is found in any image planes, or a 2D distance between a projection x' of $\overline{X}_{s,q}$ on a 2D fluoroscopic image and a matched point $x''_n$ in the $n^{th}$ 2D fluoroscopic image is greater than a predetermined threshold $Max_{2D}$, or a 3D distance between a centerline point $x_{s,q}$ and a corresponding reconstructed point $\hat{x}_{s,q}$ is greater than a predetermined threshold $Max_i\copyright$, wherein $H(x_{s,p})=1$ otherwise.

9. The method of claim 8, wherein the summation of squared 3D registration vectors, the summation of squared derivative 3D registration vectors, and the myocardial branch energy of the energy functional are $$E_{Internal}(r) = \mu \sum_{s,q} |r_{s,q}^2| + \nu \sum_{s,q} |\dot{r}_{s,q}^2| + \lambda \sum_{[i,j] \in K} \left( \frac{|r_i - r_j|}{|x_i - x_j|} \right)^2,$$

wherein r is a registration vector, x is a control point on the 3D centerline, the sums over s,q are sums over all control points of all segments of the 3D centerline, K is a set of all pairs of control points formed by linking a point on each segment that is a distance $D_s$ from a junction in the 3D centerline to corresponding control points of other segments joined at the junction wherein each link generates a force proportional to its displacement if said link is either expanded or compressed during registration.

10. The method of claim 9, wherein the energy functional is minimized by iterating $$r_{s,q}^{z+1} = r_{s,q}^z + \varepsilon \left[ H(x_{s,q})(\hat{x}_{s,q}^z - \overline{x}_{s,q}^z) - \mu r_{s,q}^z + \nu \ddot{r}_{s,q}^z + \lambda \sum_{[i] \in K_{s,p}} (r_i^z - r_{s,q}^z) \right]$$

wherein z is an iteration counter starting at point $r_{s,p}=[0,0,0]^T | \forall \{s,q\}$ at iteration z=0, wherein $\varepsilon$ is a small constant, $K_{s,q} \subset K$ is a set of constraints acting on control point (s, q), and $\mu$, $\upsilon$, and $\lambda$ are predetermined parameters.

11. A method for non-rigid registration of digital 3D coronary artery models with 2D fluoroscopic images during a cardiac intervention comprising the steps of:
    providing a digitized 3D centerline representation of a coronary artery tree, wherein the 3D centerline comprises a set of S segments composed of $Q_s$ 3D control points;
    globally aligning the 3D centerlines to at least two 2D fluoroscopic images by performing a translation-only registration of the 3D centerline to the at least two 2D fluoroscopic images, performing a rigid registration of the 3D centerline to the at least two 2D fluoroscopic images, and performing an affine registration of the 3D centerline to the at least two 2D fluoroscopic images, wherein at each step, an energy functional of the form $$E_{Global}^j(C \cdot T_j \cdot x) = \sum_n \sum_{s,q} D_{B_n}(\Psi_n \cdot P_n \cdot C \cdot T_j \cdot x)$$

is minimized, wherein j labels the translation-only registration, the rigid registration, and the affine registration, C is a coordinate transformation between a coordinate system of the 3D centerline and a coordinate system of a 3D imaging device, $T_j$ is a coordinate transformation between a coordinate system of the 3D imaging device and a coordinate system of a biplane C-arm that acquires the fluoroscopic images, for the translation-only, rigid, and affine registrations, x is a 3D point in homogeneous coordinates, n represents a sum over the fluoroscopic images, s and q label control points on the segments of the 3D centerline, $P_n$ is a coordinate transformation between the coordinate system of the biplane C-arm and the coordinate system of the $n^{th}$ fluoroscopic image, $\Psi_n$ is a projection operator that projects the 3D point x to the $n^{th}$ fluoroscopic image, and $D_{B_n}(x)$ is a distance between a 2D point on the $n^{th}$ fluoroscopic image and a closest point in the segmented coronary artery tree in the $n^{th}$ binarized image $B_n$; and
    non-rigidly registering the 3D centerline to the at least two 2D fluoroscopic images.

12. The method of claim 11, wherein non-rigidly registering the 3D centerline to the at least two 2D fluoroscopic images comprises:
    matching points in the 3D centerline to corresponding vessel centerline points in the 2D fluoroscopic images to reconstruct 3D centerline points $\hat{x}_{s,q}$ from the matched 2D points; and
    minimizing an energy functional that includes a summation of square differences between the reconstructed centerline points and registered centerline points, a summation of squared 3D registration vectors, a summation of squared derivative 3D registration vectors, and a myocardial branch energy,
    wherein the non-rigid registration of the 3D centerline is represented as a set of 3D translation vectors $r_{s,q}$ that are applied to corresponding centerline points $x_{s,q}$ in a coordinate system of the 3D centerline.

13. The method of claim 12, wherein the energy functional for non-rigidly registering the 3D centerline to the at least two 2D fluoroscopic images is $$E_{NR}(r) = \sum_{s,q} H(x_{s,q})(\hat{x}_{s,q} - \overline{x}_{s,q})^2 + \mu \sum_{s,q} |r_{s,q}^2| + \nu \sum_{s,q} |\dot{r}_{s,q}^2| + \lambda \sum_{[i,j] \in K} \left(\frac{|r_i - r_j|}{|x_i - x_j|}\right)^2,$$

wherein r is a registration vector, x is a control point on the 3D centerline, $\hat{x}_{s,q}$ is a reconstructed centerline point, $\overline{x}_{s,q}$ is a registered centerline point, $H(x_{s,p}) \rightarrow \{0,1\}$ is an indicator function $H(x_{s,p}) \cdot \{0,1\}$, wherein $H(x_{s,p})=0$ if no matching point is found in any image planes, or a 2D distance between a projection x' of $\overline{x}_{s,q}$ on a 2D fluoroscopic image and a matched point x"$_n$ in the n$^{th}$ 2D fluoroscopic image is greater than a predetermined threshold Max$_{2D}$, or a 3D distance between a centerline point $x_{s,q}$ and a corresponding reconstructed point $\hat{x}_{s,q}$ is greater than a predetermined threshold Max$_{3D}$, wherein $H(x_{s,p})=1$ otherwise, the sums over s,q are sums over all control points of all segments of the 3D centerline, K is a set of all pairs of control points formed by linking a point on each segment that is a distance $D_s$ from a junction in the 3D centerline to corresponding control points of other segments joined at the junction wherein each link generates a force proportional to its displacement if said link is either expanded or compressed during registration.

14. A non-transitory program storage device readable by a computer, tangibly embodying a program of instructions executed by the computer to perform the method steps for non-rigid registration of digital 3D coronary artery models with 2D fluoroscopic images during a cardiac intervention, the method comprising the steps of:
providing a digitized 3D centerline representation of a coronary artery tree, wherein the 3D centerline comprises a set of S segments composed of $Q_S$ 3D control points;
globally aligning the 3D centerline to at east two 2D fluoroscopic images; and
non-rigidly registering the 3D centerline to the at least two 2D fluoroscopic images by minimizing an energy functional that includes a summation of square differences between reconstructed centerline points and registered centerline points, a summation of squared 3D registration vectors, a summation of squared derivative 3D registration vectors, and a myocardial branch energy,
wherein the non-rigid registration of the 3D centerline is represented as a set of 3D translation vectors $r_{s,q}$ that are applied to corresponding centerline points $x_{s,q}$ in a coordinate system of the 3D centerline.

15. The computer readable program storage device of claim 14, wherein the coronary artery tree has been segmented from the 2D fluoroscopic images, wherein the segmented coronary artery tree is represented as a binarization of each of the 2D fluoroscopic images.

16. The computer readable program storage device of claim 15, wherein globally aligning the 3D centerline to the at least two 2D fluoroscopic images comprises:
performing a translation-only registration of the 3D centerline to the at least two 2D fluoroscopic images;
performing a rigid registration of the 3D centerline to the at least two 2D fluoroscopic images; and
performing an affine registration of the 3D centerline to the at least two 2D fluoroscopic images,
wherein at each step, an energy functional of the form $$E_{Global}^j(C \cdot T_j \cdot x) = \sum_n \sum_{s,q} D_{B_n}(\Psi_n \cdot P_n \cdot C \cdot T_j \cdot x)$$

is minimized, wherein
j labels the translation-only registration, the rigid registration, and the affine registration,
C is a coordinate transformation between a coordinate system of the 3D centerline and a coordinate system of a 3D imaging device,
$T_j$ is a coordinate transformation between a coordinate system of the 3D imaging device and a coordinate system of a biplane C-arm that acquires the fluoroscopic images, for the translation-only, rigid, and affine registrations,
x is a 3D point in homogeneous coordinates, n represents a sum over the fluoroscopic images, s and q label control points on the segments of the 3D centerline,
$P_n$ is a coordinate transformation between the coordinate system of the biplane C-arm and the coordinate system of the n$^{th}$ fluoroscopic image,
$\Psi_n$ is a projection operator that projects the 3D point x to the n$^{th}$ fluoroscopic image, and
$D_{B_n}(x)$ is a distance between a 2D point on the n$^{th}$ fluoroscopic image and a closest point in the segmented coronary artery tree in the n$^{th}$ binarized image $B_n$.

17. The computer readable program storage device of claim 16, wherein transformation matrices $T_j$ are recentered wherein any change in rotation parameters of the transformation matrixes $T_j$ induces a motion that appears to occur around the origin of the coordinate system of the 3D centerline, as opposed to the origin of the coordinate system of the 3D imaging device.

18. The computer readable program storage device of claim 16, the method further comprising:
providing a time series of F pairs of 2D fluoroscopic images, and
globally aligning the 3D centerline to each pair of 2D fluoroscopic images by minimizing the energy functional $$E_{Multi}(\chi_f) = \sum_{f=1}^{F} \sum_{n=1}^{2} \sum_{s,q} D_n(\Psi_n \cdot P_n \cdot T_f \cdot C \cdot x_{s,q}) + \gamma \sum_{f=1}^{F-1} D(T_f \cdot C \cdot x_{s,q}, T_{f+1} \cdot C \cdot x_{s,q}),$$

wherein f is a sum over time points, $T_f$ is a transformation for each time point, $\gamma$ is a predetermined parameter, and $D(T_f \cdot C \cdot x_{s,q}, T_{f+1} \cdot C \cdot x_{s,q})$ is an inter-frame distance.

19. The computer readable program storage device of claim 14, the method further comprising, after globally aligning the 3D centerline to at least two 2D fluoroscopic images, matching points in the 3D centerline to corresponding vessel centerline points in the 2D fluoroscopic images to reconstruct 3D centerline points from the matched 2D points.

20. The computer readable program storage device of claim 19, wherein matching points comprises:
finding a projection x' of each 3D centerline point $x_{s,p}$ on each 2D fluoroscopic image $I_n$ from the global alignment;

starting from x', searching a segmentation image $B_n$ corresponding to each 2D fluoroscopic image along a line perpendicular to a projection of the 3D centerline on the segmentation image B to find up to two points that may match centerline point $x_{s,p}$;

selecting a point closest to $x_{s,p}$ as a match point $x_n$;

using matched points in the fluoroscopic images to reconstruct a 3D centerline point $\hat{x}_{s,q}$ using projective geometry of an imaging system being used for the cardiac intervention.

21. The computer readable program storage device of claim 20, wherein the summation of square differences between reconstructed centerline points $\hat{x}_{s,q}$ and registered centerline points $\overline{X}_{s,q}$ is $$E_{Image}(r) = \sum_{s,q} H(x_{s,q})(\hat{x}_{s,q} - \overline{x}_{s,q})^2,$$

wherein $H(x_{s,p}) \in \{0,1\}$ is an indicator function $H(x_{s,p}) \mapsto \{0,1\}$, wherein $H(x_{s,p})=0$ if no matching point is found in any image planes, or a 2D distance between a projection x' of $\overline{X}_{s,q}$ on a 2D fluoroscopic image and a matched point $x''_n$ in the $n^{th}$ 2D fluoroscopic image is greater than a predetermined threshold $Max_{2D}$, or a 3D distance between a centerline point $x_{s,q}$ and a corresponding reconstructed point $\hat{x}_{s,q}$ is greater than a predetermined threshold $Max_{3D}$, wherein $H(x_{s,p})=1$ otherwise.

22. The computer readable program storage device of claim 21, wherein the summation of squared 3D registration vectors, the summation of squared derivative 3D registration vectors, and the myocardial branch energy of the energy functional are $$E_{Internal}(r) = \mu \sum_{s,q} |\dot{r}_{s,q}^2| + \nu \sum_{s,q} |\ddot{r}_{s,q}^2| + \lambda \sum_{\{i,j\} \in K} \left( \frac{|r_i - r_j|}{|x_i - x_j|} \right)^2,$$

wherein r is a registration vector, x is a control point on the 3D centerline, the sums over s,q are sums over all control points of all segments of the 3D centerline, K is a set of all pairs of control points formed by linking a point on each segment that is a distance $D_s$ from a junction in the 3D centerline to corresponding control points of other segments joined at the junction wherein each link generates a force proportional to its displacement if said link is either expanded or compressed during registration.

23. The computer readable program storage device of claim 22, wherein the energy functional is minimized by iterating $$r_{s,q}^{z+1} = r_{s,q}^z + \varepsilon \left[ H(x_{s,q})(\hat{x}_{s,q}^z - \overline{x}_{s,q}^z) - \mu \dot{r}_{s,q}^z + \nu \ddot{r}_{s,q}^z + \lambda \sum_{\{i\} \in K_{s,p}} (r_i^z - r_{s,q}^z) \right]$$

wherein z is an iteration counter starting at point $r_{s,p}=[0,0,0]^T | \forall \{s,q\}$ at iteration z=0, wherein $\varepsilon$ is a small constant, $K_{s,q} \subset K$ is a set of constraints acting on control point (s, q), and $\mu$, $\nu$, and $\lambda$ are predetermined parameters.

* * * * *